(12) United States Patent
Fu et al.

(10) Patent No.: US 12,419,441 B2
(45) Date of Patent: Sep. 23, 2025

(54) FIXING DEVICE AND PASSENGER DEVICE AS WELL AS CARRYING DEVICE USING THE SAME

(71) Applicant: Wonderland Switzerland AG, Steinhausen (CH)

(72) Inventors: Xiuping Fu, Steinhausen (CH); Xiaohong Xiao, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 638 days.

(21) Appl. No.: 17/584,419

(22) Filed: Jan. 26, 2022

(65) Prior Publication Data

US 2022/0234640 A1 Jul. 28, 2022

(30) Foreign Application Priority Data

Jan. 28, 2021 (CN) .......................... 202110120332.3

(51) Int. Cl.
*B62B 7/14* (2006.01)
*A47D 9/00* (2006.01)
*B62B 9/10* (2006.01)

(52) U.S. Cl.
CPC .............. *A47D 9/016* (2022.08); *B62B 7/142* (2013.01); *B62B 7/145* (2013.01); *B62B 9/102* (2013.01); *B62B 2205/20* (2013.01)

(58) Field of Classification Search
CPC ...... B62B 7/145; B62B 7/142; B62B 2205/20
See application file for complete search history.

(56) References Cited

U.S. PATENT DOCUMENTS 5,772,279 A * 6/1998 Johnson, Jr. ......... B60N 2/2848
297/440.16
6,318,807 B1 * 11/2001 Perego .................... B62B 7/145
297/130

(Continued)

FOREIGN PATENT DOCUMENTS

CN 201998843 10/2011
CN 103863380 A 6/2014

(Continued)

OTHER PUBLICATIONS

Search Report mailed/issued on Nov. 22, 2022 for JP application No. 2022-009780, Nov. 22, 2022.

(Continued)

*Primary Examiner* — Emma K Frick
(74) *Attorney, Agent, or Firm* — Winston Hsu

(57) ABSTRACT

The disclosure provides a fixing device, and a passenger device and a carrying device using fixing device. The fixing device is used to detachably fix the carrying device to the passenger device, and includes an engaging mechanism and an engaging seat. Among them, after the engaging mechanism is engaged into the engaging seat, the engaging mechanism and the engaging seat are able to be locked or unlocked, and an unlocked state holding mechanism is disposed in the engaging mechanism, and after the engaging mechanism and the engaging seat are unlocked, the unlocked state holding mechanism is able to hold the engaging mechanism and the engaging seat in an unlocked state. The fixing device according to the disclosure can fix the carrying device to the passenger device more safely.

20 Claims, 23 Drawing Sheets

(56) References Cited

U.S. PATENT DOCUMENTS

| | | | | |
|---|---|---|---|---|
| 6,695,400 | B2* | 2/2004 | Washizuka | B62B 7/145 |
| | | | | 297/217.2 |
| 6,942,294 | B2* | 9/2005 | Takamizu | B62B 7/142 |
| | | | | 297/256.16 |
| 7,032,922 | B1* | 4/2006 | Lan | B62B 7/142 |
| | | | | 280/643 |
| 7,370,913 | B2* | 5/2008 | Takamizu | B62B 7/142 |
| | | | | 297/256.16 |
| 7,377,537 | B2* | 5/2008 | Li | B62B 7/142 |
| | | | | 280/47.38 |
| 8,033,555 | B2* | 10/2011 | Mostert | B60N 2/2848 |
| | | | | 280/47.38 |
| 8,251,382 | B2* | 8/2012 | Chen | B62B 7/147 |
| | | | | 280/47.38 |
| 8,322,744 | B2* | 12/2012 | Ahnert | B62B 7/142 |
| | | | | 280/47.4 |
| 8,651,502 | B2* | 2/2014 | Winterhalter | B62B 7/006 |
| | | | | 280/643 |
| 8,807,862 | B2* | 8/2014 | Zeng | B62B 9/26 |
| | | | | 403/93 |
| 9,242,585 | B2* | 1/2016 | Kozinski | B60N 2/2848 |
| 9,327,752 | B2* | 5/2016 | Jane Santamaria | B62B 7/142 |
| 9,346,378 | B2* | 5/2016 | Zhang | B62B 7/12 |
| 9,545,940 | B2* | 1/2017 | Taylor | B62B 7/142 |
| 9,840,168 | B2* | 12/2017 | Yi | B62B 7/142 |
| 10,058,192 | B2* | 8/2018 | Williams | B60N 2/2821 |
| 10,479,390 | B2* | 11/2019 | Zhong | B62B 7/142 |
| 10,913,481 | B2* | 2/2021 | Kim | B62B 7/06 |
| 11,685,419 | B2* | 6/2023 | Yi | B62B 9/10 |
| | | | | 280/47.38 |
| 11,807,289 | B2* | 11/2023 | Zhong | B62B 7/145 |
| 11,993,301 | B2* | 5/2024 | Cheng | B62B 7/142 |
| 2005/0184564 | A1 | 8/2005 | Takamizu | |
| 2007/0187914 | A1 | 8/2007 | Jane Santamaria | |
| 2008/0179848 | A1* | 7/2008 | Lake | B62B 7/142 |
| | | | | 280/47.41 |
| 2010/0001492 | A1* | 1/2010 | Driessen | B62B 9/12 |
| | | | | 280/642 |
| 2022/0410961 | A1* | 12/2022 | Shan | B62B 9/26 |

FOREIGN PATENT DOCUMENTS

| | | | | |
|---|---|---|---|---|
| CN | 206465996 | | 9/2017 | |
| CN | 208259203 | U | 12/2018 | |
| CN | 110962906 | A | 4/2020 | |
| DE | 202007009450 | U1 * | 11/2007 | B62B 7/142 |
| EP | 1808354 | A1 * | 7/2007 | A47D 13/02 |
| JP | 2005-230245 | A | 9/2005 | |
| JP | 2005-231498 | A | 9/2005 | |
| JP | 2005-247219 | A | 9/2005 | |
| JP | 2019-98192 | A | 6/2019 | |
| TW | 202112596 | | 4/2021 | |

OTHER PUBLICATIONS

Notice of Allowance mailed/issued on Jun. 28, 2024 for JP application No. 2022-009780 ,Jun. 28, 2024.

* cited by examiner

FIXING DEVICE AND PASSENGER DEVICE AS WELL AS CARRYING DEVICE USING THE SAME

BACKGROUND OF THE DISCLOSURE

1. Field of the Disclosure

The present disclosure relates to a passenger device and a carrying device, and more particularly, to a fixing device for detachably fixing a carrying device to a passenger device.

2. Description of the Prior Art

In daily life, various passenger devices may be used, such as racks, child carriages carts for grocery shopping. A carrying device may be arranged on a passenger device for carrying person or object, such as a child seat, a child recliner, or a food basket.

SUMMARY OF THE DISCLOSURE

A purpose of the disclosure is to provide fixing device for detachably fixing a carrying device to a passenger device. As long as the user performs an unlocking operation, even if the user does not remove the carrying device from the passenger device, the fixing device will still remain in the unlocked state, and subsequently, when the user needs to remove the carrying device, there is no need to repeat the unlocking operation.

As specifically embodied and generally described herein, in order to achieve these and other advantages according to the disclosure, a fixing device for detachably fixing a carrying device to a passenger device is proposed. The fixing device includes: an engaging mechanism, disposed on one of the carrying device and the passenger device, and an engaging seat, disposed on the other one of the carrying device and the passenger device, wherein after the engaging mechanism is engaged into the engaging seat, the engaging mechanism and the engaging seat are able to be locked or unlocked, and wherein an unlocked state holding mechanism is disposed in the engaging mechanism, and after the engaging mechanism and the engaging seat are unlocked, the unlocked state holding mechanism is able to hold the engaging mechanism and the engaging seat in an unlocked state.

In an embodiment, the engaging mechanism includes a first locking member movable between a locked position and an unlocked position, and the engaging seat includes a second locking member being able to be locked with the first locking member, when the first locking member is in the locked position, the first locking member is locked with the second locking member to prevent the engaging mechanism from being separated from the engaging seat; and when the first locking member is in the unlocked position, the first locking member and the second locking member are unlocked to allow the engaging mechanism to be separated from the engaging seat.

In an embodiment, the engaging mechanism further includes an unlocking member disposed on the engaging mechanism, the unlocking member is able to be operated from an outside of the engaging mechanism to move from a first position to a second position, and when the unlocking member moves from the first position to the second position, the unlocking member is able to drive the first locking member to move from the locked position to the unlocked position.

In an embodiment, an engagement holding portion is disposed on the unlocking member, the unlocked state holding mechanism includes an unlocking holder located in the engaging mechanism, the unlocking holder includes a locking engagement hole and an unlocking engagement hole located on a surface of the unlocking holder facing the unlocking member, and the unlocking holder is able to move between a disengaged position and an engaged position, and wherein when the unlocking holder is in the disengaged position, neither the locking engagement hole nor the unlocking engagement hole of the unlocking holder engages with the engagement holding portion, and when the unlocking holder is in the engaged position, one of the locking engagement hole and the unlocking engagement hole of the unlocking holder is engaged with the engagement holding portion to restrict the unlocking member in the first position or the second position.

In an embodiment, when the unlocking holder is in the disengaged position, the unlocking holder is separated from the unlocking member by a predetermined distance.

In an embodiment, the unlocking holder further includes a boss, and when the unlocking holder is in the disengaged position, the boss extends out of the engaging mechanism, when the engaging mechanism is engaged into the engaging seat, a wall of the engaging seat presses the boss, such that the unlocking holder moves to the engaged position.

In an embodiment, a convex rib is disposed on an inner side of the wall of engaging seat at a position corresponding to the boss, and when the engaging mechanism is engaged into the engaging seat, the convex rib presses the boss, such that the unlocking holder moves to the engaged position.

In an embodiment, the unlocking holder is connected to an unlocked state holding elastic member, and the unlocked state holding elastic member drives the unlocking holder to move to the disengaged position.

In an embodiment, the locking engagement hole and the unlocking engagement hole communicate with each other through a first notch, and a width of the first notch is set to be smaller than diameters of the locking engagement hole and the unlocking engagement hole and smaller than a diameter of the engagement holding portion.

In an embodiment, at least a part of the unlocking holder that forms the first notch is elastic, such that when the unlocking member is moved from the first position to the In the second position under an external force, the engagement holding portion arranged on the unlocking member can overcome a resistance and move from the locking engagement hole to the unlocking engagement hole via the first notch.

In an embodiment, the engaging seat is a hollow casing having an opening, and the second locking member is a locking hole on the hollow casing. The first locking member includes: a locking protrusion, being able to extend out of the engaging mechanism to be locked with the locking hole of the engaging seat or to retract back inside the engaging mechanism to be unlocked with the locking hole of the engaging seat; a first pivot, located at one end of the first locking member, and pivotally disposed on the engaging mechanism such that the first locking member is able to be pivoted between the locked position and the unlocked position around the first pivot; and a movable portion, located at the other one end of the first locking member, wherein the movable portion is able to be driven by the unlocking member, so as to cause the first locking member to be pivoted from the locked position to the unlocked position, thereby causing the locking protrusion to be retracted back into the engaging mechanism to be unlocked with the locking hole of the engaging seat.

In an embodiment, the unlocking member includes: a pressing portion, located at one end of the unlocking member and exposed to an outside of the engaging mechanism; sa second pivot, located in a middle of the unlocking member and pivotally disposed on the engaging mechanism, such that the unlocking member is able to be pivoted between the first position and the second position around the second pivot; and a driving portion, located at the other one end of the unlocking member, being in contact with the first locking member and able to drive the first locking member to move from the locked position to the unlocked position.

In an embodiment, the engaging seat is a hollow casing having an opening, and the second locking member is a locking hole on the hollow casing. The first locking member includes: a locking protrusion, being able to extend out of the engaging mechanism to be locked with the locking hole of the engaging seat, or retract back inside the engaging mechanism to be unlocked with the locking hole of the engaging seat; a first pivot, located in a middle of the first locking member, and can be pivotally disposed in a pivoting hole of the engaging mechanism, such that the first locking member is able to be pivoted between the locked position and the unlocked position around the first pivot; and a pressing portion, located at the other one end of the first locking member and exposed to an outside of the engaging mechanism.

In an embodiment, holding protrusion is disposed on the first locking member, and the unlocked state holding mechanism includes a locked state holding hole and an unlocked state holding hole disposed at corresponding position of the engaging mechanism, wherein when the first locking member is in the locked position, the holding protrusion is located in the locked state holding hole, so as to restrict the first locking member in the locked position; when the first locking member is in the unlocked position, the holding protrusion is located in the unlocked state holding hole, so as to restrict the first locking member in the unlocked position; and wherein the locked state holding hole and the unlocked state holding hole are communicated through a second notch, and a width of the second notch is set to be smaller than diameters of the locked state holding hole and the unlocked state holding hole and smaller than a diameter of the holding protrusion.

In an embodiment, a part of the engaging mechanism that forms the second notch is elastic, such that when the first locking member is moved from the locking position to the unlocked position under an external force, the holding protrusion can overcome a resistance to move from the locked state holding hole to the unlocked state holding hole.

In an embodiment, the engaging seat is a hollow casing having an opening, the engaging mechanism has a fixing portion and an engaging portion extending from the fixing portion, wherein the fixing portion is used to fix the engaging mechanism to the carrying device, the engaging portion can enter and exit the hollow casing via the opening, so as to realize engaging and disengaging between the engaging mechanism and the engaging seat.

In an embodiment, the engaging seat or the engaging mechanism fixed to the cart are provided by a plurality, and the plurality of the engaging seats or the plurality of the engaging mechanisms are respectively fixed to different positions on the cart, such that the carrying device can be fixed to the different positions on the cart.

In an embodiment, a spring positioning member is disposed on a bottom of the engaging mechanism, and the spring positioning member is connected to a positioning elastic member, when the engaging mechanism is engaged into the engaging seat and the first locking member is locked with the second locking member, the spring positioning member retracts into the engaging mechanism, and the positioning elastic member is compressed; and after the first locking member and the second locking member are unlocked, the positioning elastic member is able to lift up the engaging mechanism and the carrying device.

In another solution, the disclosure proposes a passenger device that uses the fixing device mentioned above.

In yet another solution, the disclosure proposes a carrying device that uses the fixing device mentioned above.

The beneficial effect of the disclosure is that, by the fixing device according to the disclosure, the carrying device can be fixed to the cart more safely, and as long as the user performs an unlocking operation, even if the user does not remove the carrying device from the passenger device, the fixing device will still remain in the unlocked state, and subsequently, when the user needs to remove the carrying device, there is no need to repeat the unlocking operation.

From the following detailed description of the disclosure in combination of the accompanying drawings, the foregoing and other purposes, features, aspects and advantages of the disclosure will become more apparent.

BRIEF DESCRIPTION OF THE DRAWINGS

The accompanying drawings are included herein to provide a further understanding of the disclosure, and are incorporated into this specification to constitute a part of this specification. The drawings illustrate embodiments of the disclosure, and are used together with the following description to illustrate the concept of the disclosure.

In the drawings.

DETAILED DESCRIPTION

In the existing passenger device, the carrying device and the passenger device are fixed together and cannot be separated; or, although the carrying device is detachably installed on the passenger device, the installation and detachment are inconvenient. For example, when the user detaches the carrying device from the passenger device, the carrying device needs to be removed while being unlocked, which causes the operation to be very inconvenient.

The disclosure will be described in detail below by referring to the accompanying drawings.

Figure 1A:
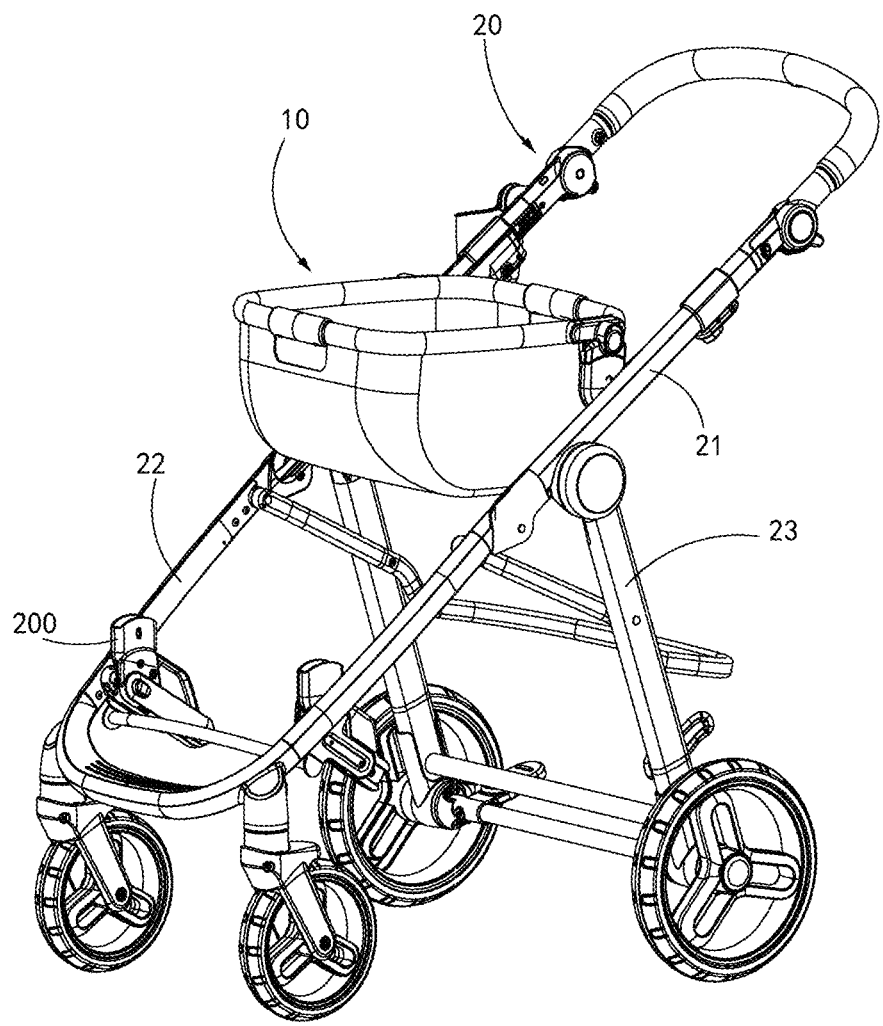
FIG. 1A is a perspective view of a carrying device after being fixed to a cart by a fixing device according to the disclosure.
Figure 1B:
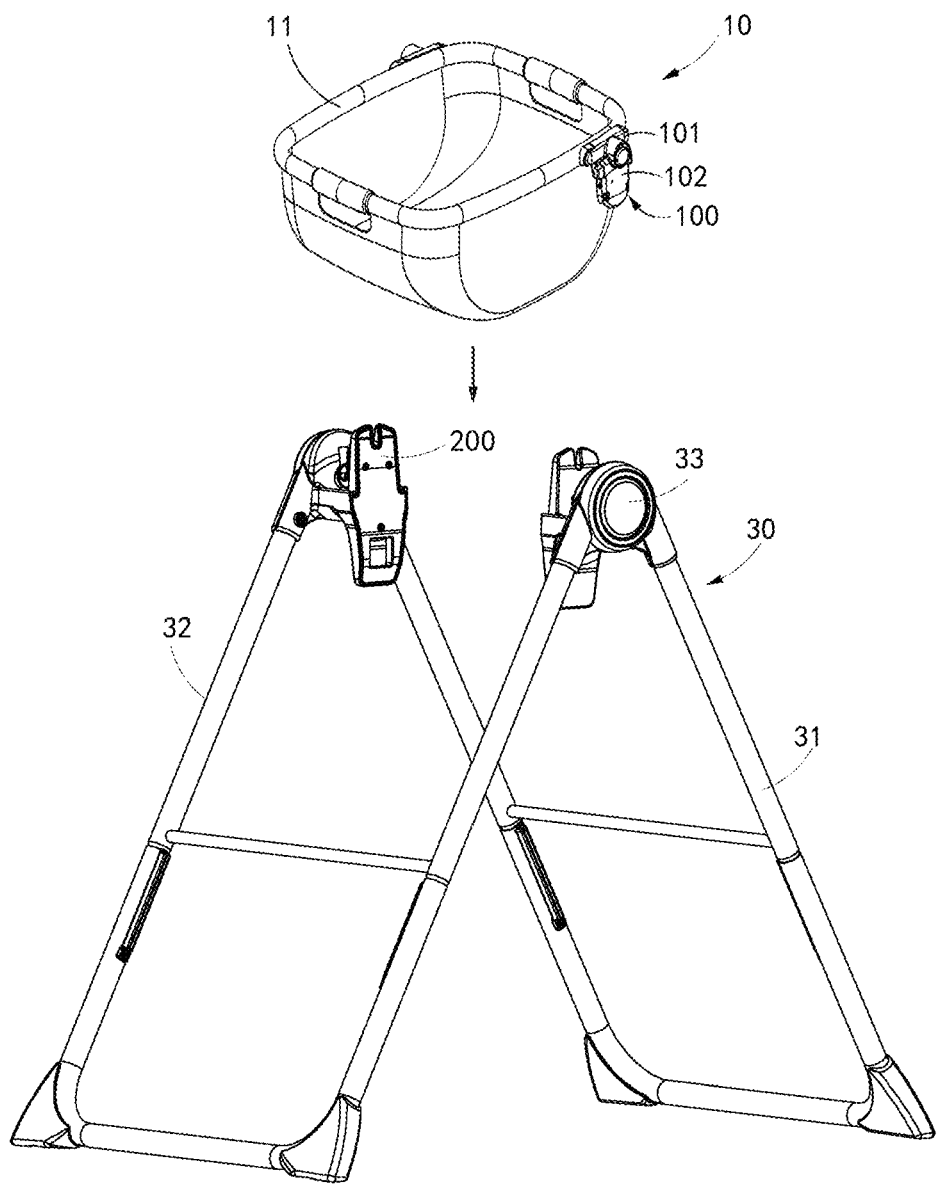
FIG. 1B is a perspective view of the carrying device before being fixed to a rack by the fixing device according to the disclosure.

As shown in FIGS. 1A and 1B, the disclosure relates to a fixing device for detachably fixing a carrying device 10 to a passenger device.

The passenger device can be various types of tools, such as a cart 20 (see FIG. 1A), a rack 30 (see FIG. 1B), a cart for grocery shopping or the like. Among them, the rack 30, in FIG. 1B can be a support device for child, such as a high chair frame body, which includes two legs 31, 32 and connecting parts 33 connecting the two legs. The two legs 31, 32 can be pivoted in respect to the connecting parts 33 to change an angle between the two legs, and the connecting parts 33 can maintain the two legs 31, 32 at any angle, thereby adjusting a height of the connecting parts 33. However, for ease of description, the cart 20 in FIG. 1A will be used as an example to describe the passenger device.

The carrying device 10 may be a carrying structure for carrying people or things, such as a child seat, a child recliner, or a storage basket, which is placed on the cart 20. The carrying device 10 is detachably fixed to the cart 20 by a fixing device, such that when the fixing device is locked, it can ensure the carrying device 10 and the cart 20 will not be separated, so as to ensure the person or things carried by the carrying device 10 will not fall out; and when the fixing device is unlocked, the carrying device 10 can be easily removed from the cart 20.

Next, the fixing device according to the disclosure will be described in detail.

Figure 2:
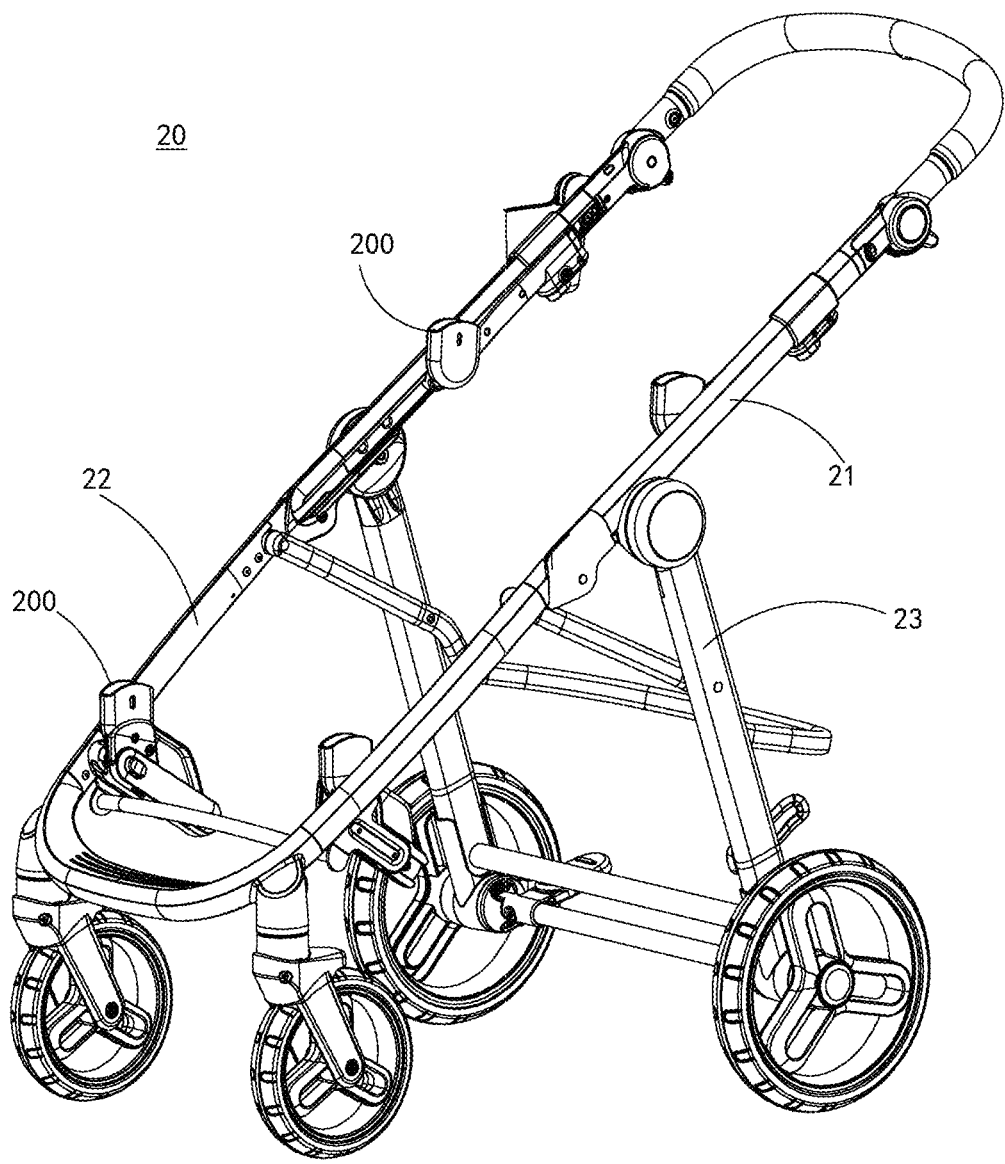
FIG. 2 is a perspective view of a cart in FIG. 1A after the carrying device is detached.
Figure 3:
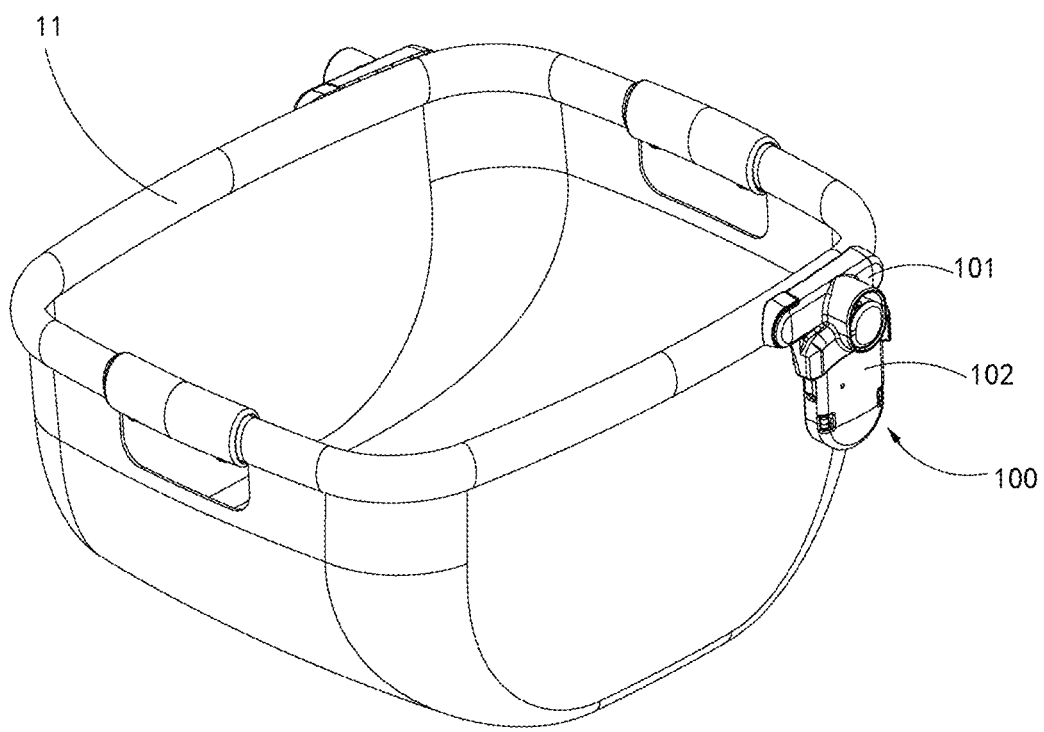
FIG. 3 is a perspective view of the carrying device in FIG. 1A.

As can be best seen in FIGS. 2 and 3, the fixing device of the disclosure includes two parts that are respectively fixed on the carrying device 10 and the cart 20, that is, an engaging mechanism 100 and an engaging seat 200. The engaging mechanism 100 is detachably engaged into the engaging seat 200, such that the carrying device 10 is detachably fixed to the cart 20. It should be understood, although the drawings show the situation where the engaging seat 200 is fixed to the cart 20, and the engaging mechanism 100 is fixed to the carrying device 10, as a replacement, the engaging seat 200 may also be fixed to the carrying device 10, and the engaging mechanism 100 may also be fixed to the cart 20, as long as the engaging mechanism 100 is detachably engaged into the engaging seat 200, such replacement will not affect the use effect of the disclosure. For ease of description, the disclosure will be illustrated by taking the situation where the engaging seat 200 is fixed to the cart 20 and the engaging mechanism 100 is fixed to the carrying device 10 as an example.

In addition, it should be specifically noted, in the embodiment shown in FIG. 1B, the engaging seat 200 may be fixed to connecting parts 33 of the rack 30, so, after the engaging mechanism 100, which is fixed to the carrying device 10, is engaged into the engaging seat 200, the rack 30 can stably support the carrying device 10.

In addition, the disclosure may employ a plurality of the engaging seats 200, and these engaging seats 200 are respectively fixed to a plurality of positions of the cart 20. For example, in the embodiment shown in FIGS. 1A and 2, one set (two) of engaging seats 200 are fixed to a handle frame 21 of the cart 20, and the other set (two) of the engaging seats 200 are fixed to a front wheel frame 22 of the cart 20. Or alternatively, the other set (two) of the engaging seats 200 may also be fixed to a rear wheel frame 23 of the cart 20. By utilizing a plurality of the engaging seats 200 and fixing the plurality of the engaging seats 200 to a plurality of positions of the cart 20, the carrying device 10 can be fixed to different positions of the cart 20, so as to meet different requirements of the user.

Figure 4:
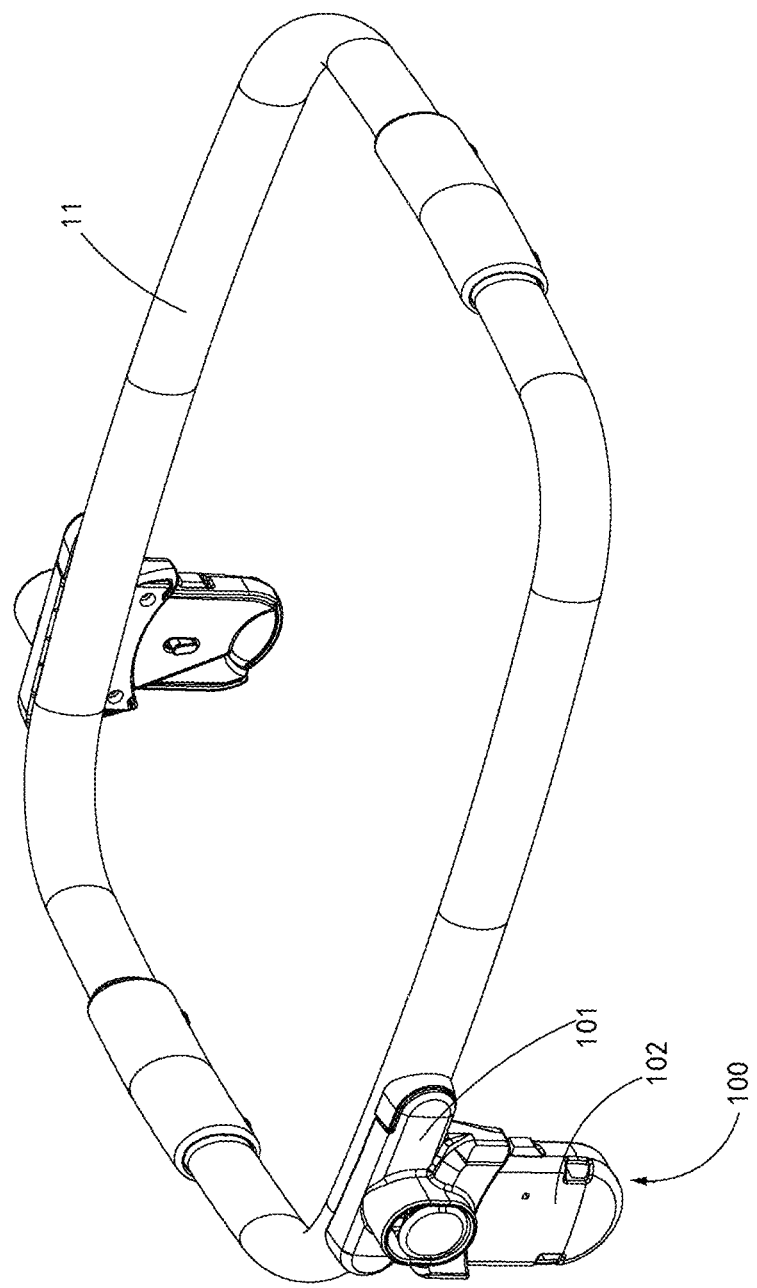
FIG. 4 is a perspective view of a frame structure of the carrying device in FIG. 1A.

Similarly, the disclosure may employ a plurality of the engaging mechanisms 100, and these engaging mechanisms 100 are respectively fixed to a plurality of positions on the carrying device 10. Of course, due to cost considerations, generally one set (two) of the engaging mechanisms 100 are used, which are respectively fixed to both sides of the carrying device 10, as shown in FIGS. 1A and 3, such that the carrying device 10 is stably supported. Advantageously, the engaging mechanisms 100 are fixed to a frame structure 11 of the carrying device 10, as best seen in FIGS. 4-6.

Hereinafter, how the engaging mechanism 100 can be detachably engaged into the engaging seat 200 will be described.

The fit between the engaging mechanism 100 and the engaging seat 200 is a concave-convex fit. In this concave-convex fit, a bulge of a convex part can be inserted into and withdrawn from a recess of a concave part, so as to realize engaging and disengaging between the two parts.

Figure 5:
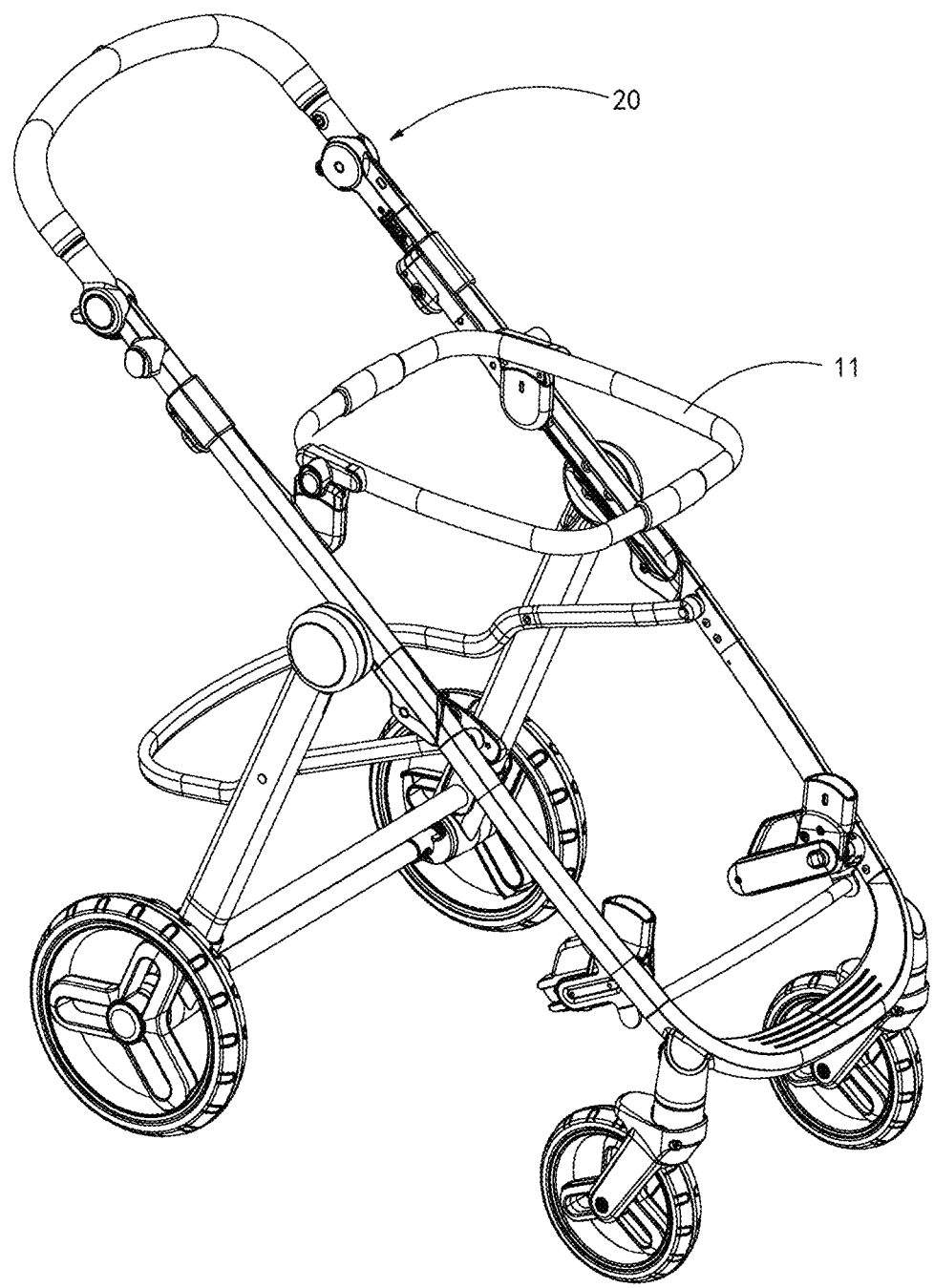
FIG. 5 is a perspective view of the frame structure of the carrying device fixed to a cart by the fixing device according to the disclosure.
Figure 6:
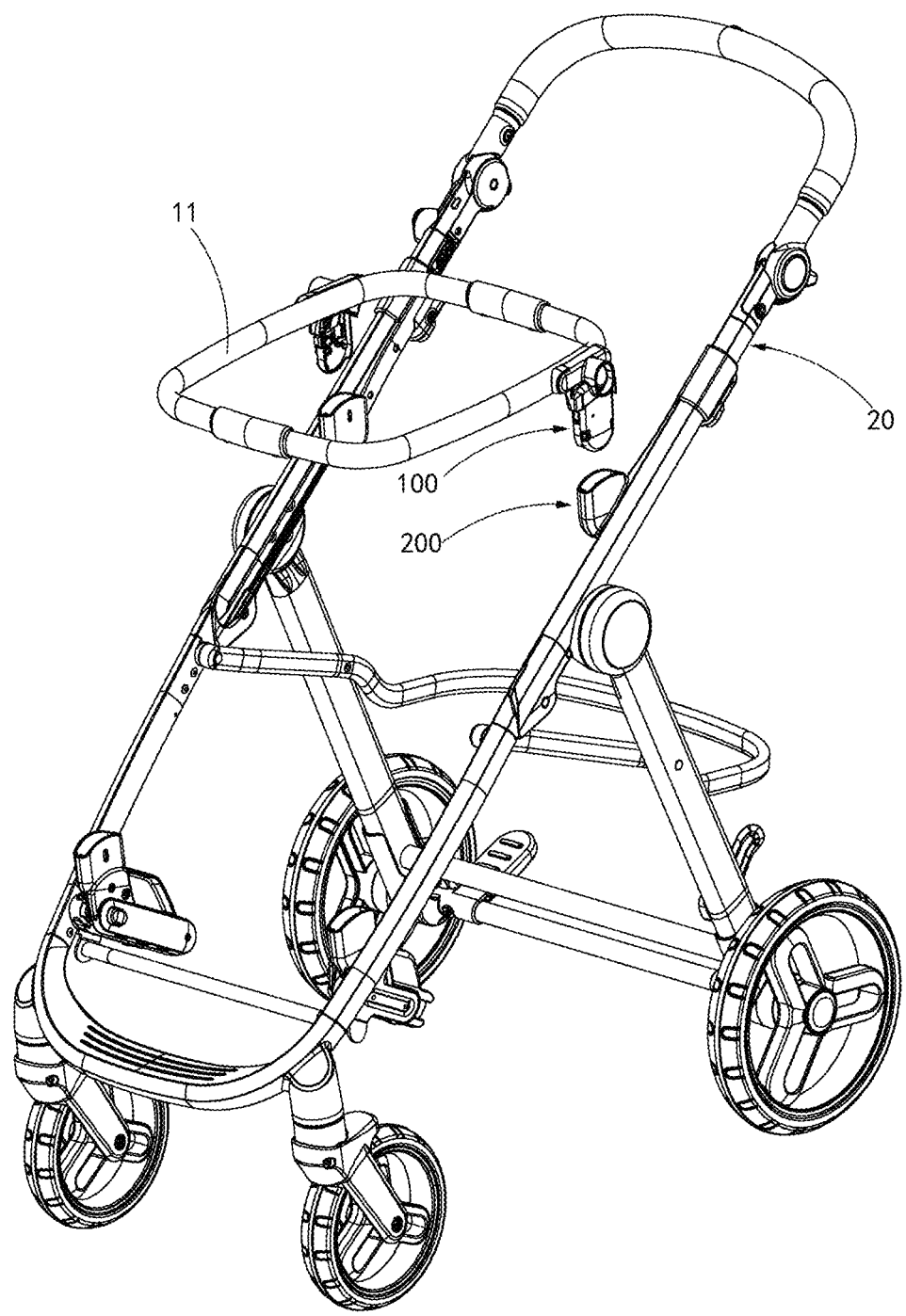
FIG. 6 is an exploded perspective view of the frame structure of the carrying device and the cart.

FIGS. 1A-7 show the engaging mechanism 100 and the engaging seat 200 according to a preferred embodiment of the disclosure. The engaging seat 200 is a hollow casing 202 having an opening 201 (see FIG. 7), and forms a concave part in a concave-convex fit. The engaging mechanism 100 has a fixing portion 101 and an engaging portion 102 (see FIGS. 3 and 4), and forms a convex part in the concave-convex fit. Among them, the fixing portion 101 is used to fix the engaging mechanism 100 to the carrying device 10, and the engaging portion 102 can enter an interior of the hollow casing 202 through the opening 201, so as to realize a engaging of the engaging mechanism 100 and the engaging seat 200, as shown in FIG. 5. On the other hand, the engaging portion 102 can also be withdrawn from the interior of the hollow casing 202, so as to realize a separating of the engaging mechanism 100 and the engaging seat 200, as shown in FIG. 6. The fixing portion 101 and the engaging portion 102 can be integrally formed, or they can be made separately and then assembled together. The engaging mechanism 100 includes a housing for containing various components therein. The housing includes openings thereon, so some components contained therein may be exposed to the outside through the openings or interact with other components other than the engaging mechanism 100.

It should be understood, the engaging seat 200 and the engaging mechanism 100 can also adopt other concave-convex fit structures that can be engaged and separated from each other than the preferred embodiment. For example, the engaging seat 200 may have a groove, and the engaging mechanism 100 may have a protrusion, moreover, the protrusion can be inserted into and withdrawn from the groove, so as to realize engaging and disengaging between the engaging mechanism 100 and the engaging seat 200.

In order to ensure that after the engaging mechanism 100 and the engaging seat 200 are engaged to each other, they will not accidentally separate, it is necessary to dispose a locking member between he engaging mechanism 100 and the engaging seat 200, such that they can be locked or unlocked. It should be noted, in the disclosure, the engaging mechanism 100 can be inserted into the engaging seat 200 and the engaging mechanism 100 can be withdrew from the engaging seat 200, such a fitting is called "engaged." Moreover, the engaging mechanism 100 and the engaging seat 200 are kept in an engaged state by means of a locking member, and the engaging mechanism 100 cannot arbitrarily withdraw from the engaging seat 200, such a fitting is called "locked." Hereinafter, the locking member between the engaging mechanism 100 and the engaging seat 200 will be described in detail.

According to the disclosure, the engaging mechanism 100 includes a first locking member 110 movable between a locked position and an unlocked position, and the engaging seat 200 includes a second locking member 210 that can be locked with the first locking member 110. When the first locking member 110 is in the locked position, the first locking member 110 and the second locking member 210 are locked, so as to prevent the engaging mechanism 100 from being separated from the engaging seat 200; and when the first locking member 110 is in the unlocked position, the first locking member 110 and the second locking member 210 are unlocked, so as to allow the engaging mechanism 100 to be separated from the engaging seat 200.

Figure 7:
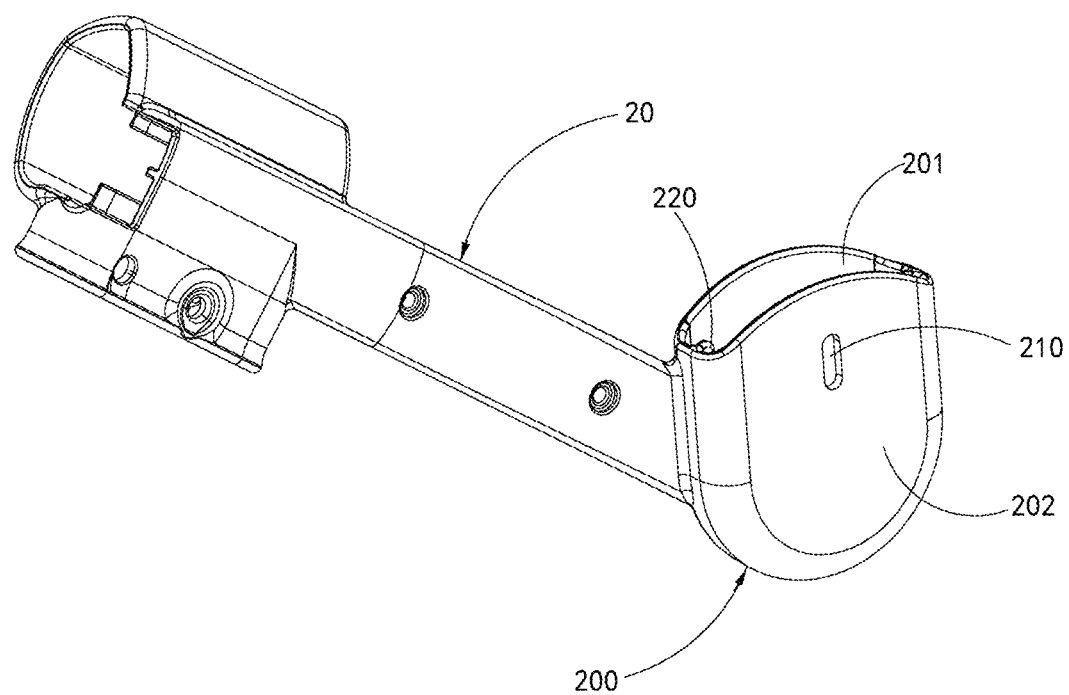
FIG. 7 shows an engaging seat of the fixing device according to an embodiment of the disclosure.
Figure 8:
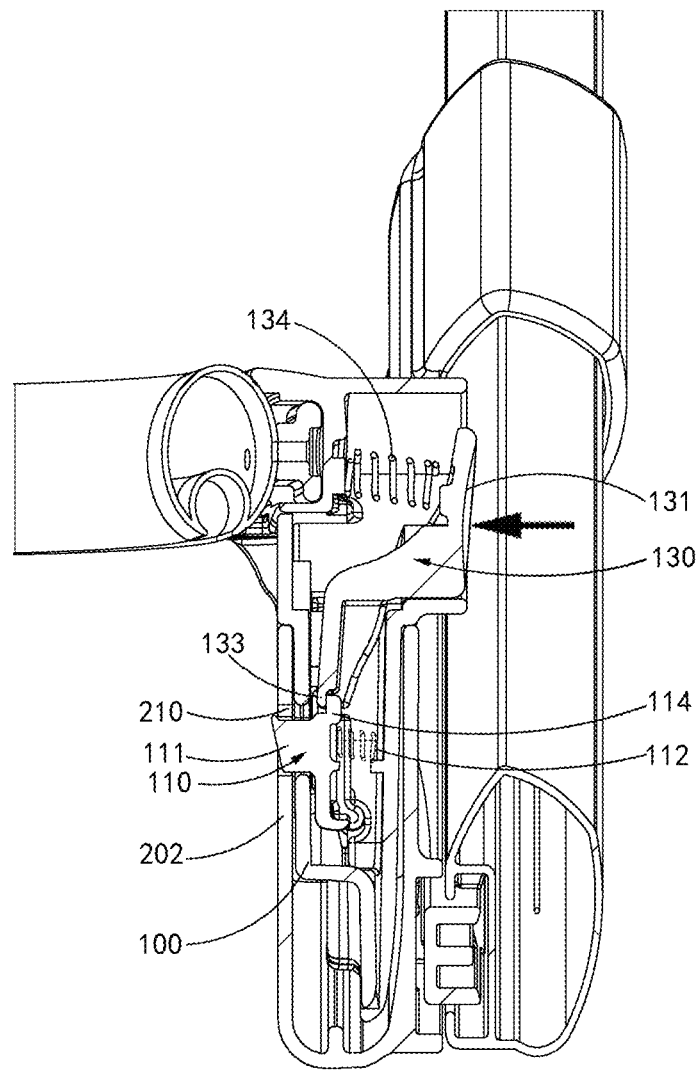
FIG. 8 shows an internal structure of an engaging mechanism according to a first preferred embodiment of the disclosure when a first locking member is in a locked position in a partially sectional manner.
Figure 9:
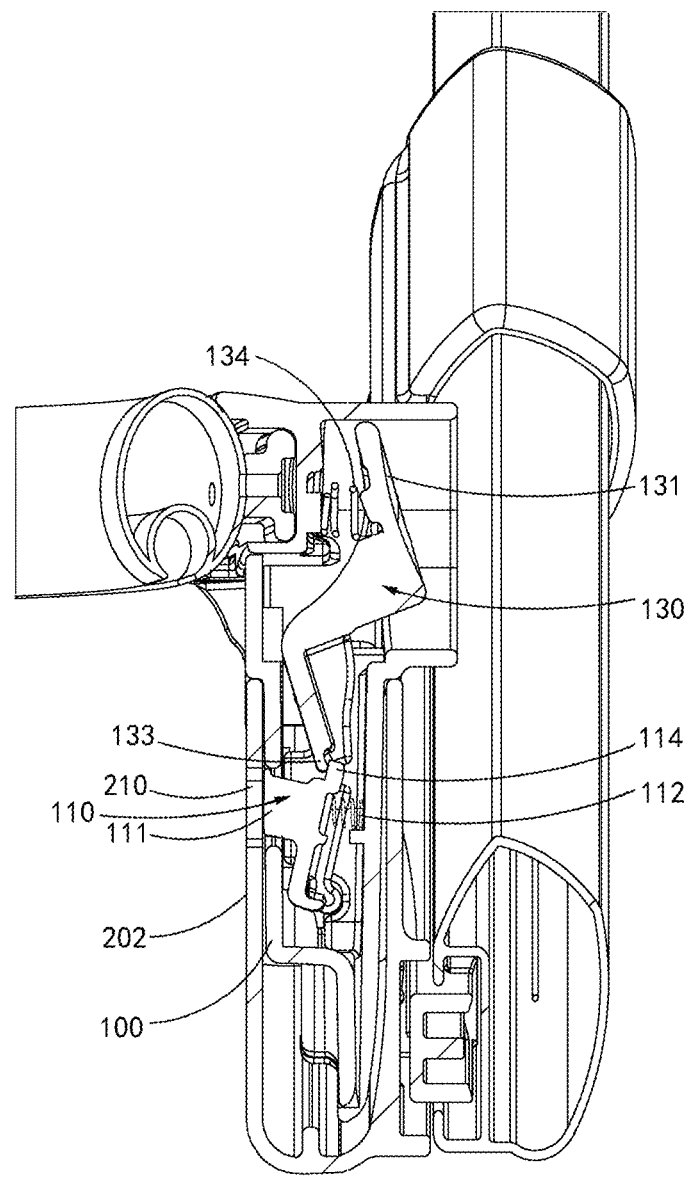
FIG. 9 shows the internal structure of the engaging mechanism according to the first preferred embodiment of the disclosure when the first locking member is in a unlocked position in a partially sectional manner.

FIGS. 7-10 show the first locking member 110 and the second locking member 210 according to the first preferred embodiment of the disclosure. Among them, as shown in FIGS. 7-9, the second locking member 210 is a locking hole on a hollow casing 202 of the engaging seat 200. The first locking member 110 includes a locking protrusion 111. The locking protrusion 111 can extend out of the engaging mechanism 100 to be locked with the locking hole of the engaging seat 200, or retract back inside the engaging mechanism 100 to be unlocked with the locking hole of the engaging seat 200.

In addition, the first locking member 110 is also connected to a locking elastic member 112. The locking elastic member 112 drives the first locking member 110 to move to the locked position, that is, driving the locking protrusion 111 to extend out of the engaging mechanism 100 to be locked with the locking hole of the engaging seat 200. The locking elastic member 112 may be a member with elastic force, such as a spring or elastic rubber.

In the situation of the first preferred embodiment, when the user fixes the carrying device 10 to the cart 20, the engaging mechanism 100 will be engaged into the engaging seat 200, and in this process, a wall of the engaging seat 200 may press the locking protrusion 111, so as to force the locking protrusion 111 to overcome the elastic force of the locking elastic member 112 and retract into the engaging mechanism 100. After the engaging mechanism 100 is completely engaged into the engaging seat 200, on the one hand, the first locking member 110 tends to move to the locked position under the elastic force of the locking elastic member 112; on the other hand, when the locking protrusion 111 is aligned with the second locking member 210 on the engaging seat 200, that is, the locking hole, the locking protrusion 111 is no longer pressed by the wall of the engaging seat 200, such that the first locking member 110 is moved to the locked position, and the locking protrusion 111 protrudes from the locking hole on the engaging seat 200 and is locked with the locking hole, thereby locking the engaging mechanism 100 into the engaging seat 200, and accordingly locking the carrying device 10 to the cart 20 also.

It should be understood, the first locking member 110 and the second locking member 210 may also utilize other locking and fitting structures different from the first preferred embodiment. For example, the second locking member 210 may be a locking protrusion on an inner side of the wall of the engaging seat 200, and a corresponding position of the first locking member 110 includes a locking concave part capable of engaging the locking protrusion; or alternatively, the second locking member 210 may be a protrusion having a shape of a positive cone on the inner side of wall of the engaging seat 200, and the corresponding position of the first locking member 110 includes a protrusion having a shape of an inverted cone which can engage the locking protrusion, and so on. In these locking and fitting structures, the locking elastic member 112 can be arranged similarly to drive the first locking member 110 to approach the second locking member 210 and to be locked with the second locking member 210.

Further, the movement of the first locking member 110 between the locked position and the unlocked position can be implemented in a variety of ways.

Figure 10:
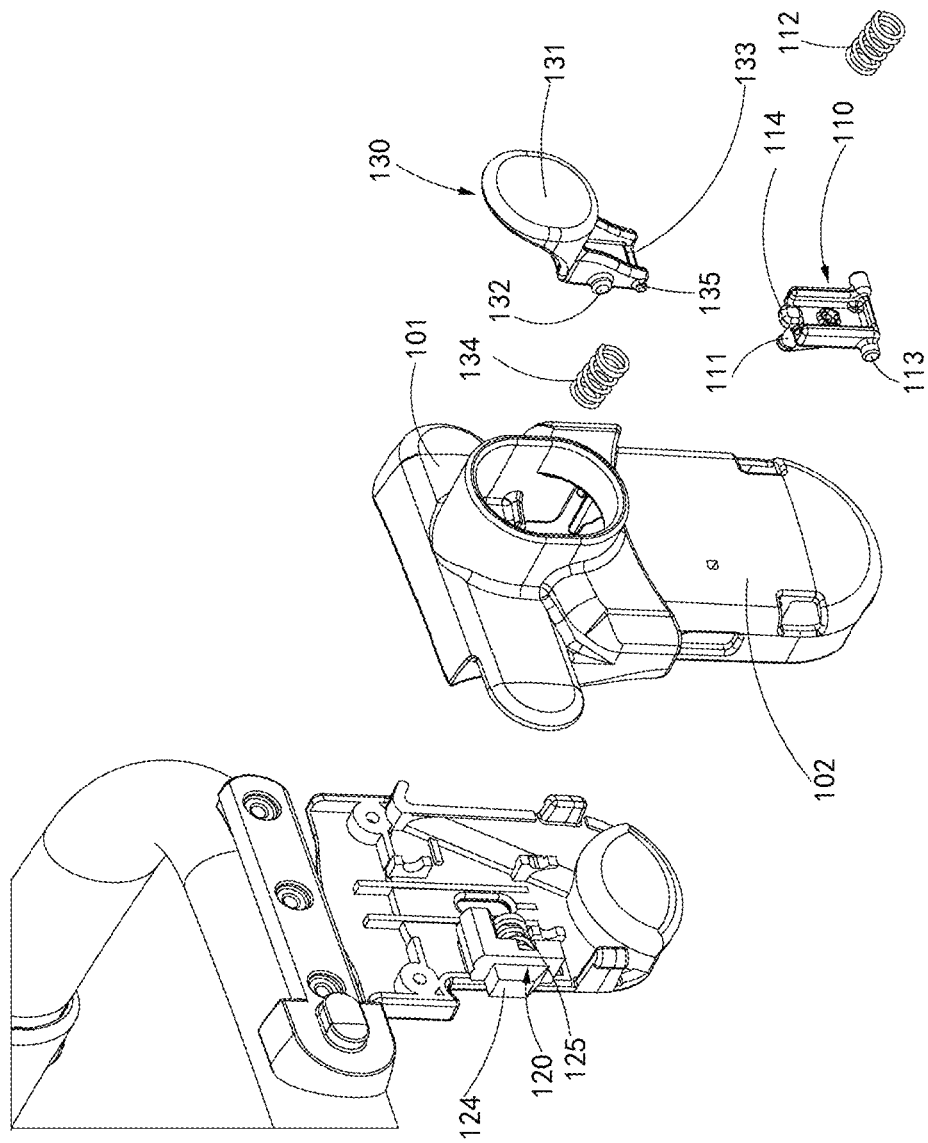
FIG. 10 is a perspective view showing the internal structure of the engaging mechanism according to the first preferred embodiment of the disclosure.
Figure 11:
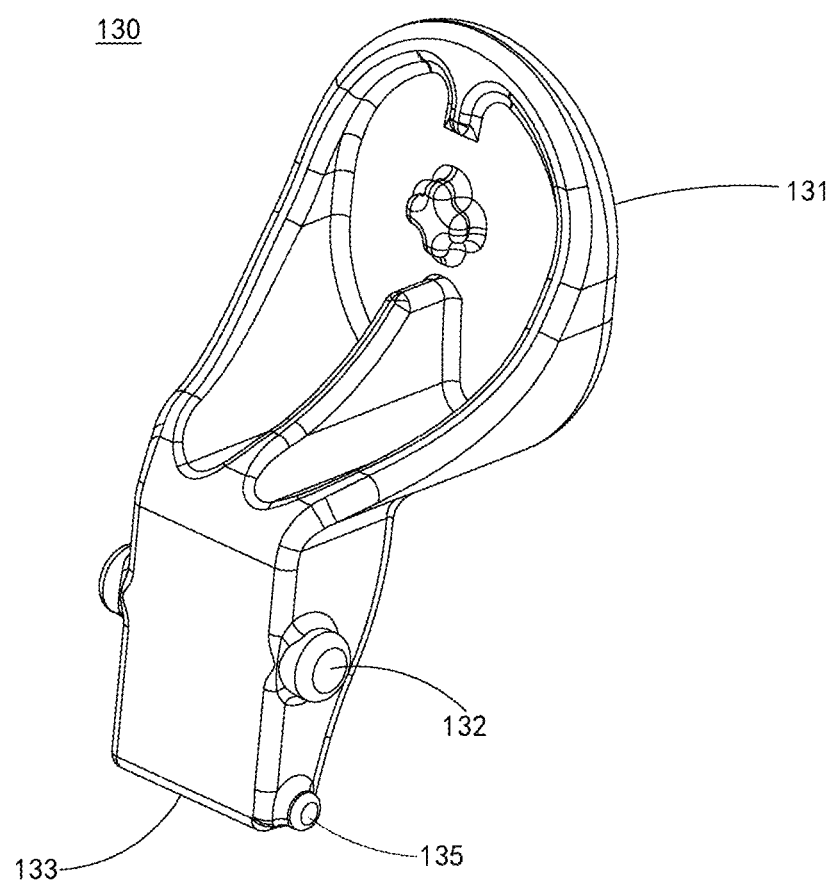
FIG. 11 is a perspective view of an unlocking member according to the first preferred embodiment of the disclosure.

As shown in FIGS. 8-10, according to the first preferred embodiment of the disclosure, the first locking member 110 further includes a first pivot 113 located at one end of the first locking member 110. The first pivot 113 is pivotally disposed on the engaging mechanism 100, and preferably between the fixing portion 101 and the engaging portion 102 of the engaging mechanism 100, such that the first locking member 110 can be pivoted around the first pivot 113 between the locked position and the unlocked position. The first locking member 110 further includes a movable portion 114, which is advantageously located at the other end of the first locking member 110.

The first locking member 110 is usually kept in the locked position under an action of the locking elastic member 112. When the user applies a force to the movable portion 114, the first locking member 110 can overcome the elastic force of the locking elastic member 112 to be pivoted from the locked position to the unlocked position around the first pivot 113, thereby causing the locking protrusion 111 to be retracted back into the engaging mechanism 100 and unlocked with the second locking member 210 of the engaging seat 200.

In order to facilitate the user to apply force to the movable portion 114 of the first locking member 110, the engaging mechanism 100 further includes an unlocking member 130. The unlocking member 130 can be operated from the outside of the locking mechanism 100, preferably by a pressing operation, so as to move between a first position and a second position. Moreover, the unlocking member 130 contacts the first locking member 110 and is arranged such that when the unlocking member 130 is pivoted from the first position to the second position, the unlocking member 130 drives the first locking member 110 to move from the locked position to the unlocked position; and when the unlocking member 130 is in the second position, the unlocking member 130 can keep the first locking member 110 in the unlocked position, as shown in FIG. 9; furthermore, when the unlocking member 130 is in the first position, the unlocking member 130 cannot prevent the first locking member 110 from moving from the locked position to the unlocked position.

FIGS. 8-11 show the unlocking member 130 according to the first preferred embodiment of the disclosure, where the unlocking member 130 includes: a pressing portion 131, located at one end of the unlocking member 130 and exposed to the outside of the engaging mechanism 100 for facilitating the user to press; a second pivot 132, located in the middle of the unlocking member 130, the second pivot 132 is pivotally disposed on the engaging mechanism 100, and preferably between the fixing portion 101 of the engaging mechanism 100 and the engaging portion 102, such that the unlocking member 130 can be pivoted from the first position to the second position around the second pivot 132; and a driving portion 133, located at the other end of the unlocking member 130, the driving portion 133 can be in contact with the movable portion 114 of the first locking member 110 and is arranged such that when the unlocking member 130 is pivoted from the first position to the second position, the driving portion 133 brings the movable portion 114 of the first locking member 110 to move, thereby driving the first locking member 110 from the locked position to the unlocked position; when the unlocking member 130 is in the second position, the driving portion 133 can keep the first locking member 110 in the unlocked position, as shown in FIG. 9; and when the unlocking member 130 is in the first position, the driving portion 133 cannot prevent the first locking member 110 from moving from the locked position to the unlocked position. It should be understood, although an embodiment about action modes between the unlocking member 130 and the first locking member 110 has been described above, the disclosure is not limited to this. Rather, the unlocking member 130 and the first locking member 110 both can adopt other structures capable of realizing their functions, which will be described later, so there are other action modes between the unlocking member 130 and the first locking member 110.

In the situation of the first preferred embodiment, if the user prepares to remove the carrying device 10 from the cart 20, it is necessary to separate the engaging mechanism 100 from the engaging seat 200. At this time, the unlocking member 130 is in the first position, and the first locking member 110 is in the locked position, as shown in FIG. 8. When the user presses the pressing portion 131 of the unlocking member 130 in the direction of the arrow, the pressing portion 131 moves to the left under the pressing force. Therefore, the unlocking member 130 moves from the first position to the second position around the second pivot 132, such that the driving portion 133 moves to the right, thereby driving the movable portion 114 of the first locking member 110 to move to the right, and the locking protrusion 111 accordingly moves to the right to be unlocked with the locking hole of the engaging seat 200, thereby moving the first locking member 110 to unlocked position, as shown in FIG. 9. As a result, the engaging mechanism 100 can be separated from the engaging seat 200 upward, and the carrying device 10 can be removed from the cart 20 accordingly.

When the user no longer presses, in order to enable the unlocking member 130 to return from the second position to the first position, the unlocking member 130 may be connected to a return elastic member 134, as best seen in FIGS. 8-10. The return elastic member 134 may be a member having an elastic force, such as a spring or elastic rubber.

It should be understood, according to the disclosure, the implementation modes of moving the first locking member 110 from the locked position to the unlocked position is not limited to the above-mentioned embodiment.

For example, the first locking member 110 is not limited to performing a pivoting movement, rather, it can also perform a translational movement, for example, a guide rail mechanism may be provided between the first locking member 110 and the inner side of wall of the engaging mechanism 100, such that the first locking member 110 can translate between the locked position and the unlocked position.

For another example, the unlocking member 130 is not limited to performing a pivoting movement either, and it can also perform a translational movement, for example, a guide rail mechanism may be provided between the unlocking member 130 and the inner side of wall of the engaging mechanism 100, such that the unlocking member 130 can translate between the first position and the second position, and the translation of the unlocking member 130 can also drive the first locking member 110 to move between the locked position and the unlocked position.

For a further example, the separate unlocking member 130 may not be even be provided, instead, an extended portion may be disposed on the first locking member 110, the extended portion may be extended out of the engaging mechanism 100, so the user may operate the first locking member 110 through the extended portion, so as to move the first locking member 110 between the locked position and the unlocked position. FIGS. 17-20 show a second preferred embodiment according to the disclosure. In this preferred embodiment, no separate unlocking member is provided, or in other words, the unlocking member is formed as a part of the first locking member. Among them, the locking protrusion 111' is located at one end of the first locking member 110', and the locking protrusion 110' can also extend out of the engaging mechanism 100 to be locked with the locking hole of the engaging seat 200, or retract back inside the engaging mechanism 100 to be unlocked with the locking hole of the engaging seat 200. The first pivot 113' is located in the middle of the first locking member 110', and the first pivot 113' is pivotally arranged in a pivoting hole 103 on the engaging mechanism 100 (see FIG. 16), such that the first locking member 110' can be pivoted between the locked position and the unlocked position around the first pivot 113'; moreover, the pressing portion 131' extending out of the engaging mechanism 100 is arranged at the other end of the first locking member 110', and the pressing portion 131' may play an unlocking role.

Figure 19:
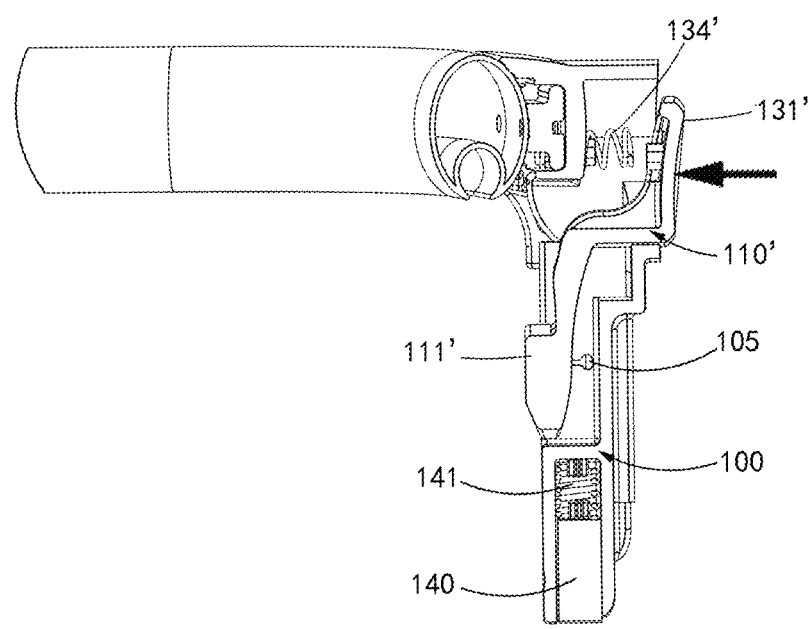
FIG. 19 shows a state of the internal structure of the engaging mechanism according to the second preferred embodiment of the disclosure when the first locking member is in the locked position in a partially sectional manner.

FIG. 19 shows the first locking member 110 in the locked position. When the user presses the pressing portion 131' of the first locking member 110' in the direction of the arrow, the pressing portion 131' moves to the left under the pressing force, so the first locking member 110' is pivoted from the locked position to the unlocked position around the first pivot 113', thereby causing the locking protrusion 111' to move to the right to be unlocked with the locking hole of the engaging seat 200, such that the first locking member 110' is in the unlocked position, as shown in FIG. 20.

Figure 20:
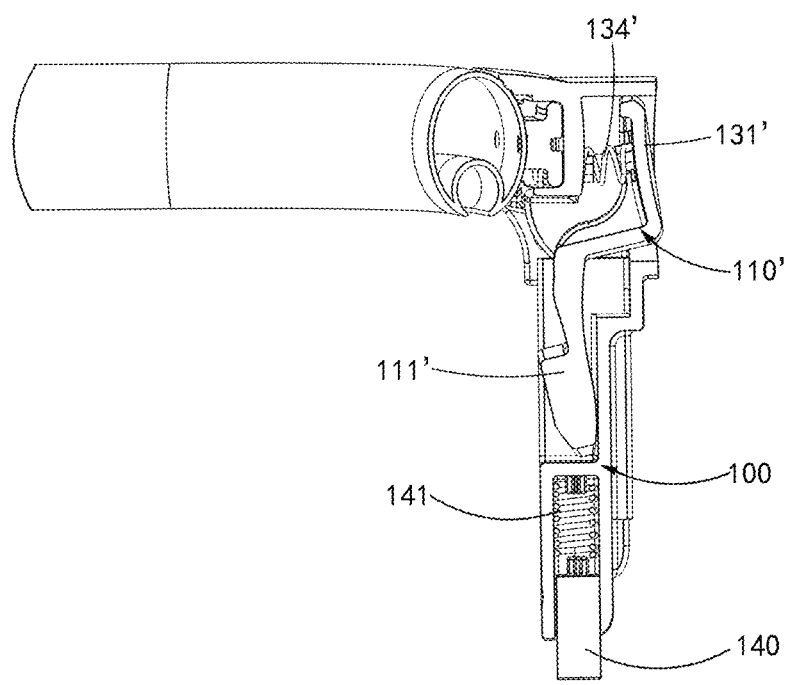
FIG. 20 shows a state of the internal structure of the engaging mechanism according to the second preferred embodiment of the disclosure when the first locking member is in the unlocked position in a partially sectional manner.
Figure 21:
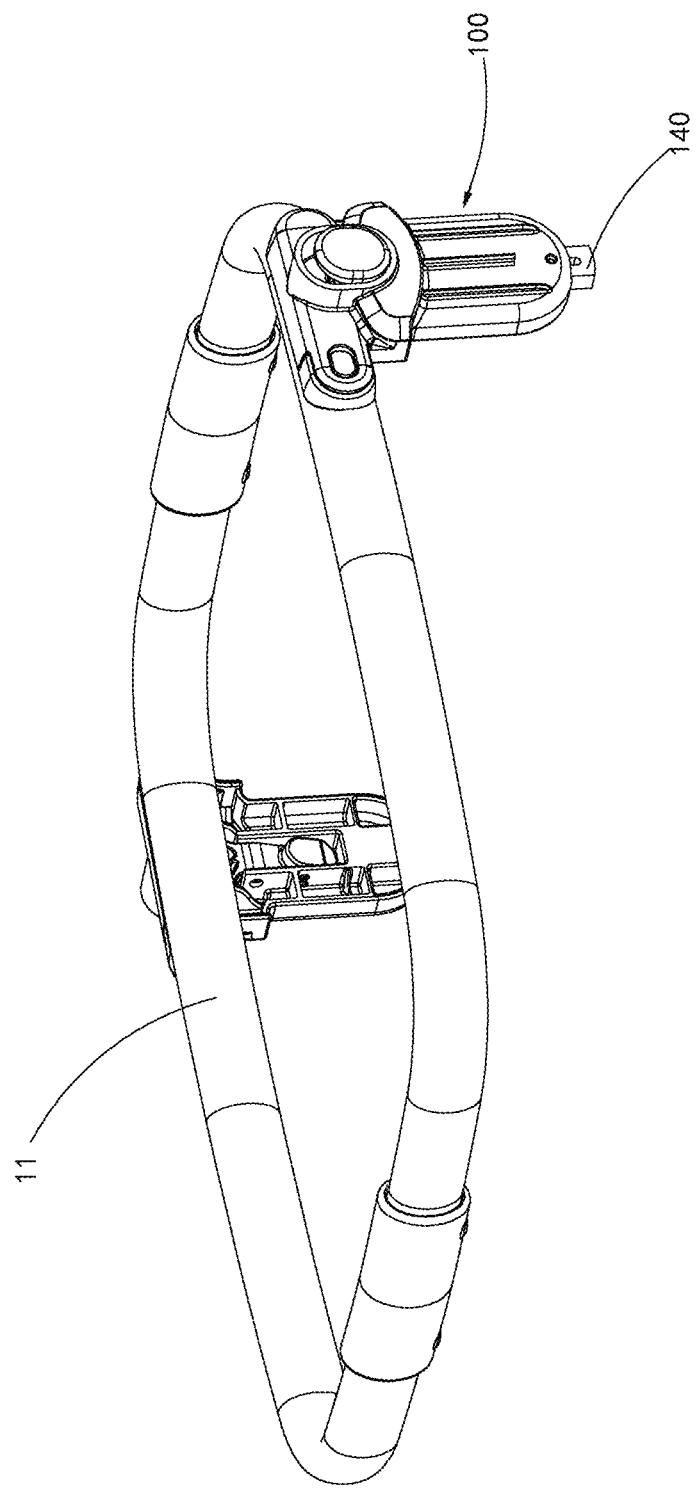
FIG. 21 is a perspective view showing a spring positioning member located in the engaging mechanism.
Figure 22:
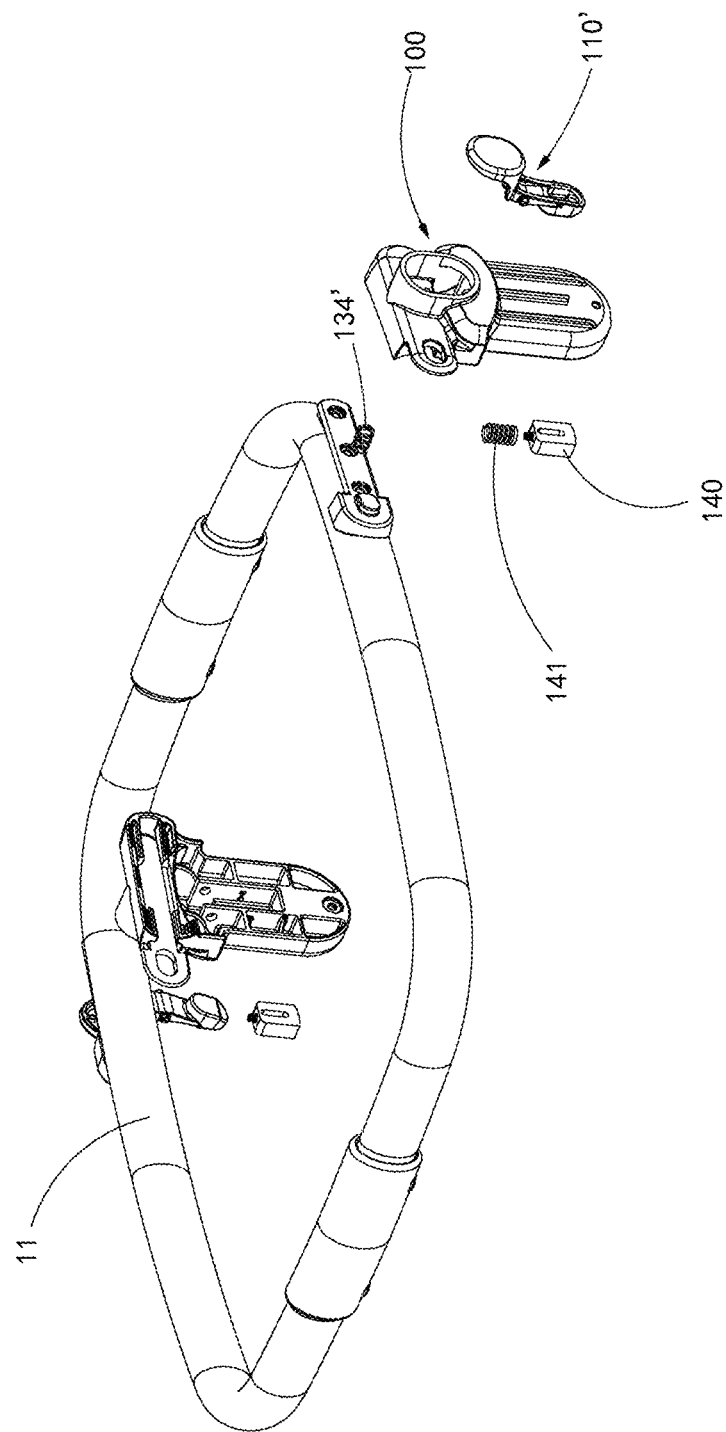
FIG. 22 is an exploded perspective view showing the spring positioning member and the engaging mechanism.

When the user no longer presses, in order to enable the first locking member 110' to return from the unlocked position to the locked position, the first locking member 110' may be connected to a return elastic member 134', as best seen in FIGS. 19, 20, and 22. The return elastic member 134' may be a member having a elastic force, such as a spring or elastic rubber.

Hereinafter, an important design of the disclosure will be described.

In order to further facilitate the user to remove the carrying device 10 from the cart 20, the disclosure particularly provides an unlocked state holding mechanism in the engaging mechanism 100. After the engaging mechanism 100 is unlocked with the engaging seat 200, the unlocked state holding mechanism can hold the engaging mechanism 100 and the engaging seat 200 in an unlocked state. Specifically, after the user presses the pressing portion 131 to move the first locking member 110 to the unlocked position, the unlocked state holding mechanism can hold the first locking member 110 in the unlocked position. In such situation, even if the user no longer presses the pressing portion 131 of the unlocking member 130, the first locking member 110 and the second locking member 210 still remain in an unlocked state. Therefore, although the engaging mechanism 100 is located in the engaging seat 200, the engaging mechanism 100 and the engaging seat 200 can be separated at any time, so the user can directly remove the carrying device 10 from the cart 20 without having to perform the unlocking operation again or having to removing the carrying device and unlocking the fixing device at the same time, which causes inconvenience in operation.

Figure 12:
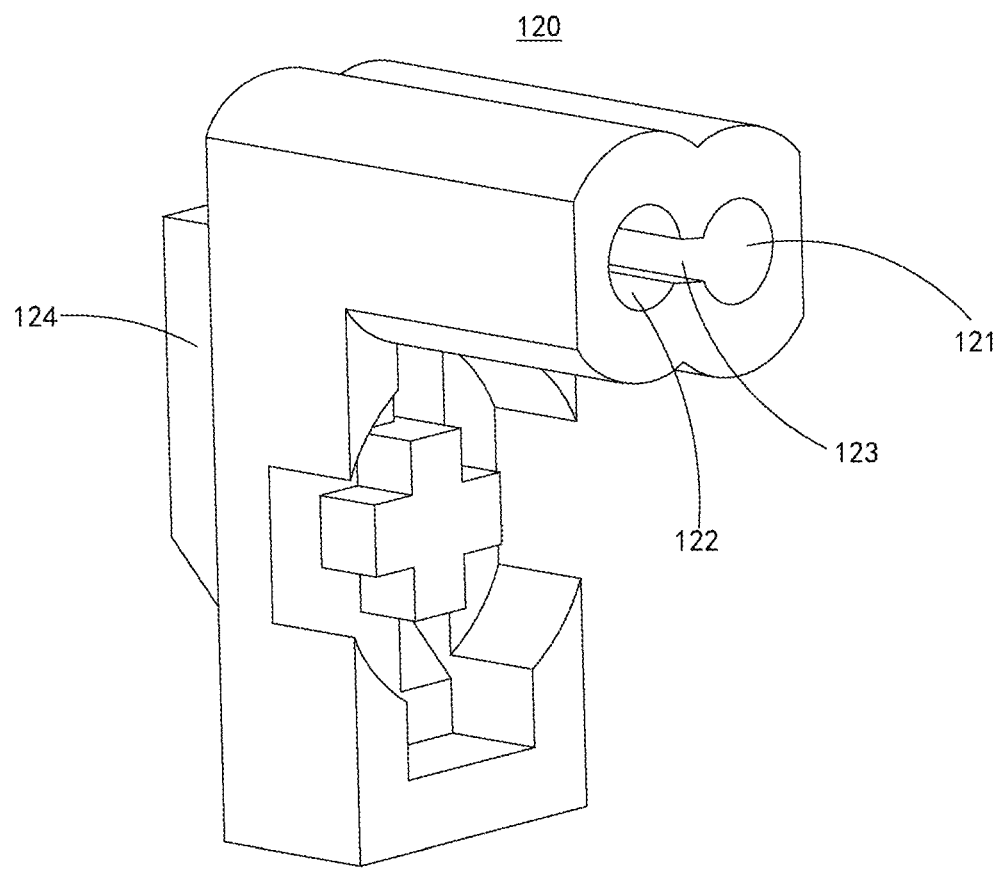
FIG. 12 is a perspective view of an unlocking holder according to the first preferred embodiment of the disclosure.

FIGS. 10 and 12-16 show the unlocked state holding mechanism according to the first preferred embodiment of the disclosure. The unlocked state holding mechanism includes an unlocking holder 120 located in the engaging mechanism 100, and the unlocking member 130 includes an engagement holding portion 135. The unlocking holder 120 includes a locking engagement hole 121 and an unlocking engagement hole 122. As best seen in FIG. 12, the locking engagement hole 121 and the unlocking engagement hole 122 are both located on a surface of the unlocking holder 120 facing the unlocking member 130. The locking engagement hole 121 and unlocking engagement hole 122 respectively corresponds to the position of the engagement holding portion 135 when the unlocking member 130 is in the first position or in the second position.

The engagement holding portion 135 may adopt various structures such as protrusions, short posts, etc., as long as it can engage with the locking engagement hole 121 and the unlocking engagement hole 122.

The unlocking holder 120 can move between a disengaged position and an engaged position. Among them, when the unlocking holder 120 is in the disengaged position, neither the locking engagement hole 121 nor the unlocking engagement hole 122 of the unlocking holder 120 is engaged with the engagement holding portion 135, so at this time, the movement of the unlocking member 130 is not restricted by the unlocking holder 120.

Figure 13:
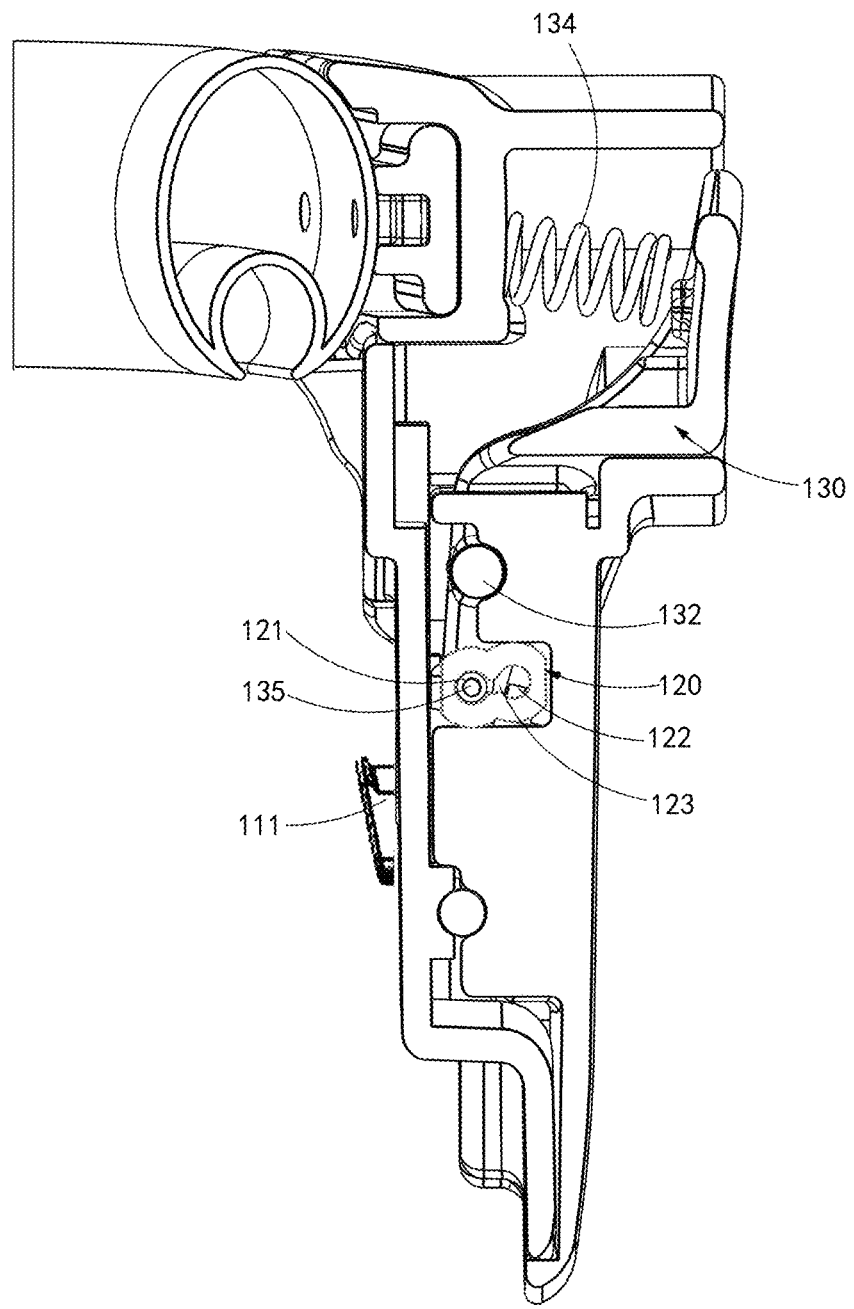
FIG. 13 shows a state in which a locking engagement hole of the unlocking holder is engaged with an engagement holding portion according to the first preferred embodiment of the disclosure in a partially sectional manner.
Figure 14:
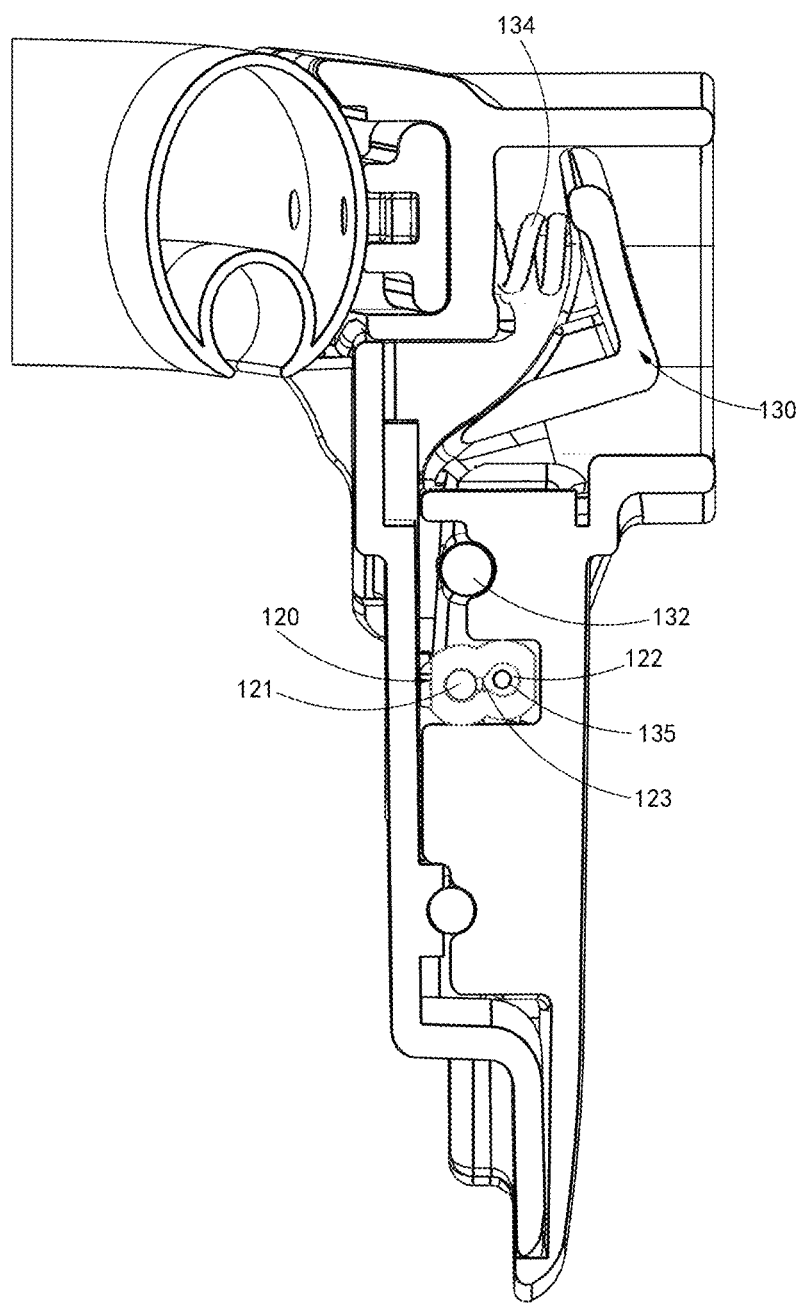
FIG. 14 shows a state in which an unlocking engagement hole of the unlocking holder is engaged with the engagement holding portion according to the first preferred embodiment of the disclosure in a partially sectional manner.

When the unlocking holder 120 is in the engaged position, the locking engagement hole 121 of the unlocking holder 120 engages with the engagement holding portion 135, so as to restrict the unlocking member 130 in the first position, as shown in FIG. 13; or the unlocking engagement hole 122 engages with the engagement holding portion 135, so as to restrict the unlocking member 130 in the second position, as shown in FIG. 14. In both situations, the movement of the unlocking member 130 is restricted by the unlocking holder 120.

The disclosure may adopt various ways to realize the movement of the unlocking holder 120 between the disengaged position and the engaged position. For example, a member similar to the unlocking member 130 may be arranged to be linked with the unlocking holder 120 and has a part exposed to the outside of the engaging mechanism 100, such that the member can be operated from the outside of the engaging mechanism 100, thereby brining the unlocking holder 120 to move between the disengaged position and the engaged position. For another example, an extended portion may be further disposed on the unlocking holder 120. The extended portion may extend out of the engaging mechanism 100, such that the user can operate the unlocking holder 120 to move between the disengaged position and the engaged position through the extended portion.

According to the first preferred embodiment of the disclosure, an automatic mode is provided to realize the unlocking holder 120 moving between the disengaged position and the engaged position. By this automatic mode, the unlocking holder 120 can move automatically during the process of the engaging mechanism 100 being engaged into the engaging seat 200 and separated from the engaging seat 200.

As can be best seen in FIGS. 10 and 12, the unlocking holder 120 includes a boss 124. The boss 124 can extend out of the engaging mechanism 100. As can be best seen in FIGS. 10 and 13-14, the unlocking holder 120 is connected to an unlocked state holding elastic member 125, and the unlocked state holding elastic member 125 drives the unlocking holder 120 to move to the disengaged position. The unlocked state holding elastic member 125 may be a member having an elastic force such as a spring or elastic rubber.

Figure 15:
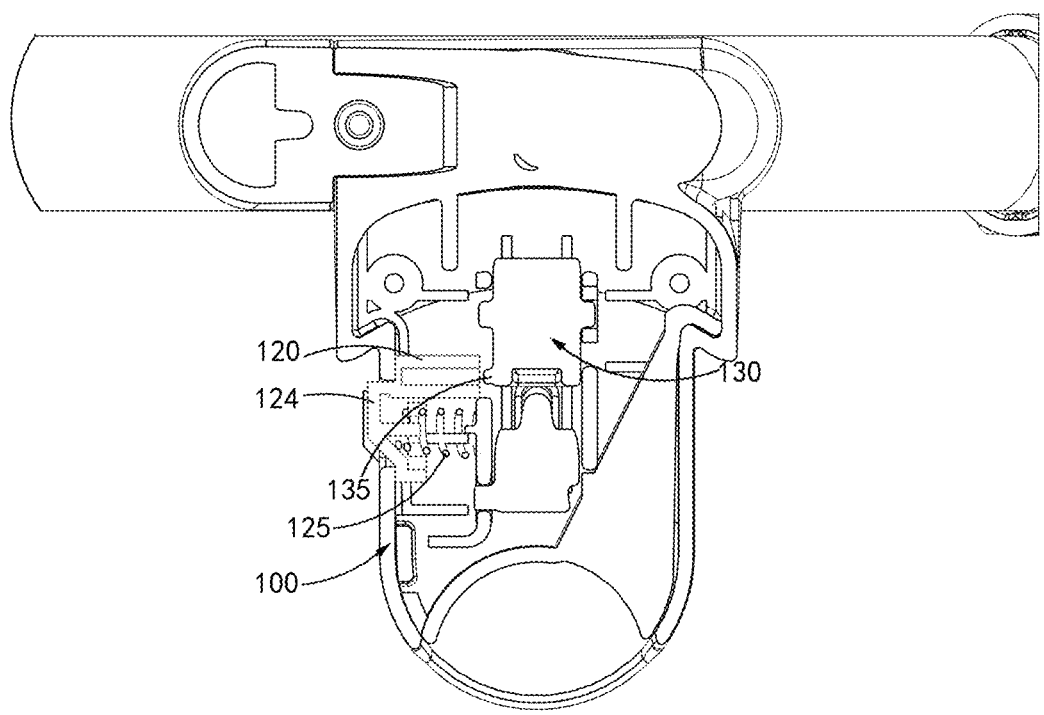
FIG. 15 shows a state in which the unlocking holder is in a disengaged position according to the first preferred embodiment of the disclosure in a partially sectional manner.

In the situation of the first preferred embodiment, when the user does not place the carrying device 10 on the cart 20 or remove the carrying device 10 from the cart 20, the engaging mechanism 100 is separated from the engaging seat 200. At this time, the unlocking holder 120 moves to the disengaged position under the action of the unlocked state holding elastic member 125, and the boss 124 extend out of the engaging mechanism 100, as shown in FIG. 15. Since the movement of the unlocking member 130 is not restricted by the unlocking holder 120 at this time, the unlocking member 130 can move between the first position and the second position.

Figure 16:
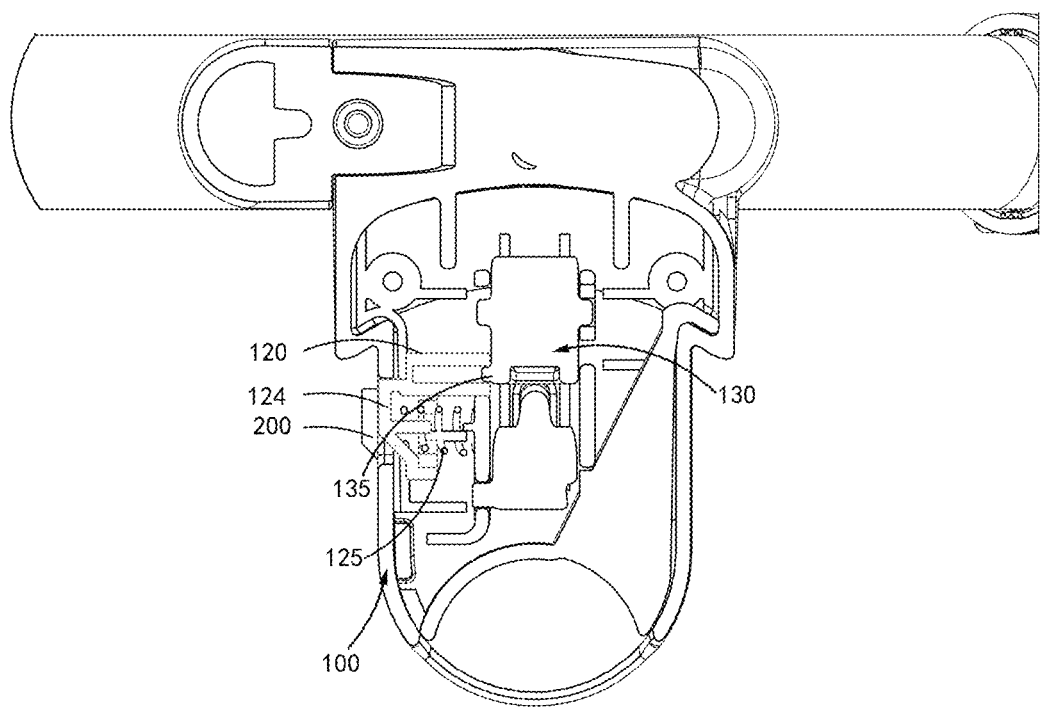
FIG. 16 shows a state in which the unlocking holder is in an engaged position according to the first preferred embodiment of the disclosure in a partially sectional manner.
Figure 17:
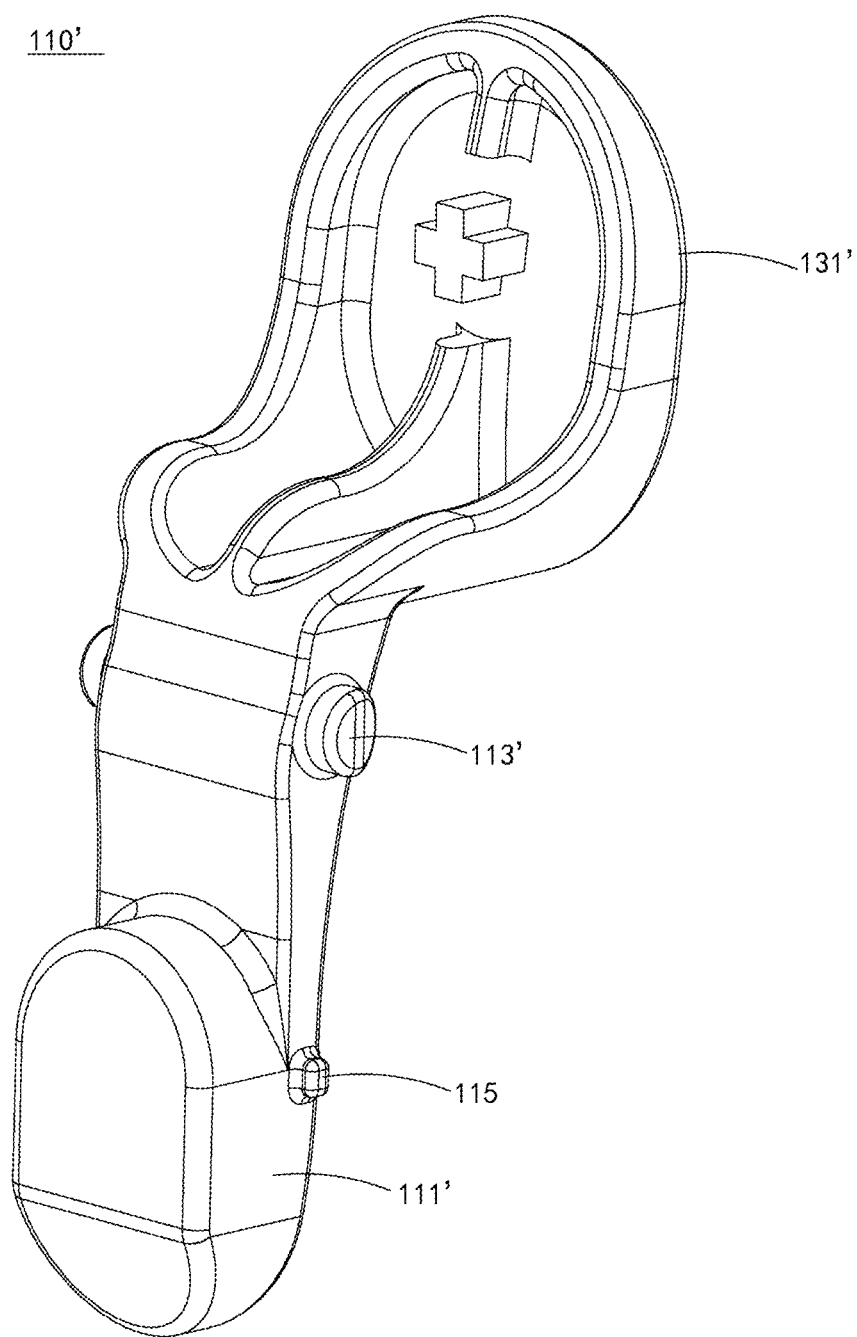
FIG. 17 is a perspective view of the first locking member according to a second preferred embodiment of the disclosure.

When the user places the carrying device 10 on the cart 20, the wall of the engaging seat 200 will press the boss 124 to force the boss 124 to retract into the engaging mechanism 100 during the process of the engaging mechanism 100 being engaged into the engaging seat 200, such that the unlocking holder 120 moves to the engaged position, and the locking engagement hole 121 is engaged with the engagement holding portion 135, as shown in FIG. 16.

It should be noted here, as mentioned above, since the unlocking member 130 and the first locking member 110 are in contact with each other and are arranged such that when the unlocking member 130 is in the first position, the unlocking member 130 cannot prevent the first locking member 110 from moving from the locked position to the unlocked position. Therefore, during the process the user places the carrying device 10 on the cart 20, even if the unlocking member 130 is restricted to the first position by the unlocking holder 120, the first locking member 110 is still able to move from the locked position to the unlocked position. Specifically, during the process the engaging mechanism 100 being engaged into the engaging seat 200, the wall of the engaging seat 200 will press the locking protrusion 111 of the first locking member 110, forcing the locking protrusion 111 to overcome the elastic force of the locking elastic member 112 and retract into the engaging mechanism 100, such that the first locking member 110 moves from the locked position to the unlocked position.

On the other hand, as mentioned above, since the unlocking member 130 and the first locking member 110 are also arranged such that when the unlocking member 130 is in the second position, the unlocking member 130 can keep the first locking member 110 in the unlocked position. Therefore, if the user prepares to remove the carrying device 10 from the cart 20, it is necessary to unlock the engaging mechanism 100 and the engaging seat 200. The user can operate the unlocking member 130 to move the unlocking member 130 to the second position, so the first locking member 110 is also moved to the unlocked position. In such situation, if the unlocking member 130 is restricted to the second position by the unlocking holder 120, the first locking member 110 will also be restricted to the unlocked position. This function will make the user more convenient, because the user only needs to operate the unlocking member 130 once, for example, by pressing the pressing portion 131 of the unlocking member 130 once, the engaging mechanism 100 can be unlocked with the engaging seat 200 and remain in the unlocked state. After that, the user does not need to operate the unlocking member 130 again. Although the engaging mechanism 100 is engaged in the engaging seat 200, the user can remove the carrying device 10 from the cart 20 at any time.

More advantageously, a convex rib 220 is arranged on the inner side of the wall of the engaging seat 200 at a position corresponding to the boss 124. When the engaging mechanism 100 is engaged into the engaging seat 200, the convex rib 220 will press the boss 124, such that the unlocking holder 120 is moved to the engaged position. The arrangement of the convex rib 220 makes a movable stroke of the unlocking holder 120 longer, thereby ensuring the locking engagement hole 121 and the unlocking engagement hole 122 are engaged with the engagement holding portion 135.

In the situation of the above-mentioned automatic mode, the unlocking holder 120 can automatically move, without the user's operation, between the disengaged position and the engaged position by pressing between the wall of the engaging seat 200 and the boss 124 as well as the action of the unlocked state holding elastic member 125. Such automatic mode is convenient, however, a problem is created: after the engaging mechanism 100 is completely engaged into the engaging seat 200, the first locking member 110 returns to the locked position under the elastic force of the elastic member 112, and the unlocking holder 120 moves to the engaged position due to its boss 124 being pressed by the wall of the engaging seat 200, such that the locking engagement hole 121 of the unlocking holder 120 is engaged with the engagement holding portion 135. At this time, the unlocking member 130 is restricted to the first position by the unlocking holder 120 and cannot be moved to the second position, so the first locking member 110 cannot be driven from the locked position to the unlocked position, that is, the engaging mechanism 100 cannot be unlocked with the engaging seat 200.

In order to solve this problem, the locking engagement hole 121 and the unlocking engagement hole 122 may be communicated through a first notch 123, as shown in FIG. 12-14, such that the engagement holding portion 135 can move from the locking engagement hole 121 to the unlocking engagement hole 122 via the first notch 123. Moreover, a width of the first notch 123 is set to be smaller than diameters of the locking engagement hole 121 and the unlocking engagement hole 122 and smaller than a diameter of the engagement holding portion 135. In this way, the engagement holding portion 135 is prevented from easily moving between the locking engagement hole 121 and the unlocking engagement hole 122 via the first notch 123, so as to maintain the function of the unlocking holder 120 restricting the unlocking member 130 to the first position or the second position.

At least a portion of the unlocking holder 120 that forms the first notch 123 is elastic, such that the engagement holding portion 135 has to overcome a considerable resistance to move from the locking engagement hole 121 to the unlocking engagement hole 122 via the first notch 123. As a result, only when the unlocking member 130 is moved from the first position to the second position under an external force applied by the user, the engagement holding portion 135 arranged on the unlocking member 130 can move from the locking engagement hole 121 to the unlocking engagement hole 122 via the first notch 123.

Here, it is possible to adopt a solution that the entire unlocking holder 120 is elastic, or it can also adopt a solution that only the part forming the first notch 123 is elastic, that is, the unlocking holder 120 may be composed of at least two parts, the part forming the first notch 123 is elastic, and the other part may be or may be not elastic.

It should be noted, the preferred solution of forming a communication between the locking engagement hole 121 and the unlocking engagement hole 122 through the first notch 123 is mainly used in the embodiment for the automatic mode described above, which causes the unlocking holder 120 to automatically move between the disengaged position and the engaged position (i.e., the unlocking holder 120 can automatically move between the disengaged position and the engaged position by the pressing force between the wall of the engaging seat 200 and the boss 124 and the force of the unlocked state holding elastic member 125, without the user's manual operation). Such solution is not necessarily adopted in other embodiments. For example, in order to realize the unlocking holder 120 moving between the disengaged position and the engaged position, a member similar to the unlocking member 130 may be disposed, which is linked with the unlocking holder 120 and has a part exposed to the outside of the engaging mechanism 100, such that the member can be operated from the outside of the engaging mechanism 100, thereby brining the unlocking holder 120 to move between the disengaged position and the engaged position. For another example, an extended portion can be disposed on the unlocking holder 120, the extended portion may extend out of the engaging mechanism 100, such that the user can perform an operation on the unlocking holder 120 through the extended portion, thereby moving the unlocking holder 120 between the disengaged position and the engaged position. In those embodiments the user manually performs operations, since the unlocking holder 120 is not automatically moves between the disengaged position and the engaged position by the pressing force between the wall of the engaging seat 200 and the boss 124 and the force of the unlocked state holding elastic member 125, it is unnecessary to adopt the preferred solution of forming the first notch 123 between the locking engagement hole 121 and the unlocking engagement hole 122.

FIGS. 17-20 show the unlocked state holding mechanism according to the second preferred embodiment of the disclosure, which includes: a holding protrusion 115 disposed on the first locking member 110'; and a locked state holding hole 104 and an unlocked state holding hole 105 disposed at corresponding positions on the engaging mechanism 100. Among them, when the first locking member 110' is in the locked position, the holding protrusion 115 is located in the locked state holding hole 104, so as to restrict the first locking member 110' in the locked position, as shown in FIG. 19; moreover, when the first locking member 110' is in the unlocked position, the holding protrusion 115 is located in the unlocked state holding hole 105, so as to restrict the first locking member 110' in the unlocked position, as shown in FIG. 20.

Figure 18:
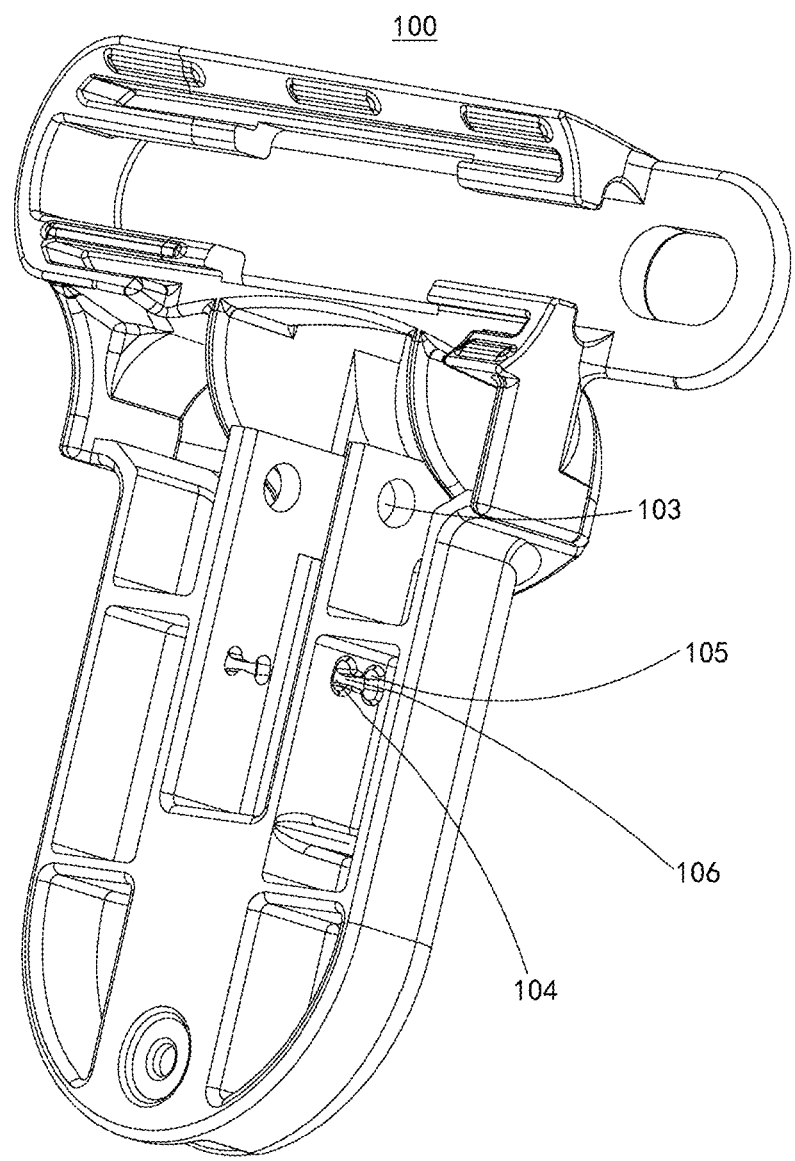
FIG. 18 is a perspective view showing the internal structure of the engaging mechanism according to the second preferred embodiment of the disclosure.

In order to enable the first locking member 110' to move between the locked position and the unlocked position, the locked state holding hole 104 and the unlocked state holding hole 105 communicate through a second notch 106, as best seen in FIG. 18, such that the holding protrusion 115 can move from the locked state holding hole 104 to the unlocked state holding hole 105 via the second notch 106. Moreover, a width of the second notch 106 is set to be smaller than the diameters of the locked state holding hole 104 and the unlocked state holding hole 105 and smaller than the diameter of the holding protrusion 115. In this way, the holding protrusion 115 is prevented from easily moving between the locked state holding hole 104 and the unlocked state holding hole 105 via the second notch 106, such that the function of the unlocked state holding mechanism of being able to restrict the first locking member 110' in the locked position or the unlocked position is maintained.

Meanwhile, the part of the engaging mechanism 100 that forms the second notch 106 is elastic, for example, an elastic finger portion is formed, such that the holding protrusion 115 needs to overcome a considerable resistance to move from the locked state holding hole 104 to the unlocked state holding hole 105 via the second notch 106. As a result, only when the first locking member 110' is moved from the locked position to the unlocked position under the external force applied by the user, the holding protrusion 115 arranged on the first locking member 110' can move from the locked state holding hole 104 to the unlocked state holding hole 105 via the second notch 106.

Here, the part of the engaging mechanism 100 that forms the second notch 106 is elastic means, the engaging mechanism 100 may be composed of at least two parts, the part that forms the second notch 106 is elastic, a housing of the engaging mechanism 100 is not elastic, and the other part may be or may be not elastic.

As shown in FIGS. 19-22, a spring positioning member 140 is disposed on a bottom of the engaging mechanism 100. The spring positioning member 140 is connected to a positioning elastic member 141, see FIGS. 19-20 and 22. When the engaging mechanism 100 is engaged into the engaging seat 200, and the first locking member 110' and the second locking member 210 are locked, the spring positioning member 140 will retract into the engaging mechanism 100, and the positioning elastic member 141 will be compressed, as shown in FIG. 19. When the first locking member 110' is unlocked with the second locking member 210, the positioning elastic member 141 can lift up the engaging mechanism 100 and the carrying device 10, as shown in FIG. 20, so that the user can more easily remove the carrying device 10 from the cart 20.

The foregoing embodiments and advantages are only exemplary, and cannot be regarded as a limitation of the disclosure. The description herein is intended to be an example, not to limit the scope of the claims. For those skilled in the art, various alternatives, modifications and modifications are obvious. The features, structures, methods, and other characteristics of the exemplary embodiments described herein can be combined in various ways to obtain other and/or alternative exemplary embodiments.

Since the features of the disclosure can be embodied in various forms without departing from the characteristics of the disclosure, it should also be understood, the above-mentioned embodiments are not limited to any details described above, unless otherwise noted, rather, these embodiments should be interpreted broadly as being within the scope defined by the appended claims. Therefore, all modifications and alterations falling within the scope and limits of the claims or equivalent solutions of such scope and limits should be covered by the appended claims.

What is claimed is:

1. A fixing device for detachably fixing a carrying device to a passenger device, wherein the fixing device comprises:
    an engaging mechanism, disposed on one of the carrying device and the passenger device, the engaging mechanism comprising an unlocking member, an engagement holding portion being disposed on the unlocking member, and
    an engaging seat, disposed on the other one of the carrying device and the passenger device,
    wherein after the engaging mechanism is engaged into the engaging seat, the engaging mechanism and the engaging seat are able to be locked or unlocked, the unlocking member is able to unlock the engaging mechanism and the engaging seat, and
    wherein an unlocked state holding mechanism is disposed in the engaging mechanism, the unlocked state holding mechanism comprises an unlocking holder located in the engaging mechanism, the unlocking holder comprises an unlocking engagement hole, after the engaging mechanism and the engaging seat are unlocked, the unlocking engagement hole is able to be engaged with the engagement holding portion to hold the engaging mechanism and the engaging seat in an unlocked state.

2. The fixing device according to claim 1, wherein the engaging mechanism comprises a first locking member movable between a locked position and an unlocked position, and the engaging seat comprises a second locking member being able to be locked with the first locking member, when the first locking member is in the locked position, the first locking member is locked with the second locking member to prevent the engaging mechanism from being separated from the engaging seat; and when the first locking member is in the unlocked position, the first locking member and the second locking member are unlocked to allow the engaging mechanism to be separated from the engaging seat.

3. The fixing device according to claim 2, wherein the unlocking member is able to be operated from an outside of the engaging mechanism to move from a first position to a second position, when the unlocking member moves from the first position to the second position, the unlocking member is able to drive the first locking member to move from the locked position to the unlocked position.

4. The fixing device according to claim 3, wherein the unlocking holder comprises a locking engagement hole and the unlocking engagement hole located on a surface of the unlocking holder facing the unlocking member, and the unlocking holder is able to move between a disengaged position and an engaged position, and
wherein when the unlocking holder is in the disengaged position, neither the locking engagement hole nor the unlocking engagement hole of the unlocking holder engages with the engagement holding portion, and when the unlocking holder is in the engaged position, one of the locking engagement hole and the unlocking engagement hole of the unlocking holder is engaged with the engagement holding portion to restrict the unlocking member in the first position or the second position.

5. The fixing device according to claim 4, wherein the unlocking holder further comprises a boss, when the unlocking holder is in the disengaged position, the boss extends out of the engaging mechanism, when the engaging mechanism is engaged into the engaging seat, a wall of the engaging seat presses the boss, such that the unlocking holder moves to the engaged position.

6. The fixing device according to claim 5, wherein a convex rib is disposed on an inner side of the wall of engaging seat at a position corresponding to the boss, when the engaging mechanism is engaged into the engaging seat, the convex rib presses the boss, such that the unlocking holder moves to the engaged position.

7. The fixing device according to claim 4, wherein the locking engagement hole and the unlocking engagement hole communicate with each other through a first notch, and a width of the first notch is set to be smaller than diameters of the locking engagement hole and the unlocking engagement hole and smaller than a diameter of the engagement holding portion.

8. A passenger device, wherein the passenger device uses the fixing device according to claim 4.

9. A carrying device, wherein the carrying device uses the fixing device according to claim 4.

10. The fixing device according to claim 3, wherein the engaging seat is a hollow casing having an opening, and the second locking member is a locking hole on the hollow casing; and
the first locking member comprises:
a locking protrusion, being able to extend out of the engaging mechanism to be locked with the locking hole of the engaging seat or to retract back inside the engaging mechanism to be unlocked with the locking hole of the engaging seat;
a first pivot, located at one end of the first locking member, and pivotally disposed on the engaging mechanism such that the first locking member is able to be pivoted between the locked position and the unlocked position around the first pivot; and
a movable portion, located at the other one end of the first locking member,
wherein the movable portion is able to be driven by the unlocking member, so as to cause the first locking member to be pivoted from the locked position to the unlocked position, thereby causing the locking protrusion to be retracted back into the engaging mechanism to be unlocked with the locking hole of the engaging seat.

11. The fixing device according to claim 10, wherein the unlocking member comprises:
a pressing portion, located at one end of the unlocking member and exposed to an outside of the engaging mechanism;
a second pivot, located in a middle of the unlocking member and pivotally disposed on the engaging mechanism, such that the unlocking member is able to be pivoted between the first position and the second position around the second pivot; and
a driving portion, located at the other one end of the unlocking member, being in contact with the first locking member and able to drive the first locking member to move from the locked position to the unlocked position.

12. A passenger device, wherein the passenger device uses the fixing device according to claim 3.

13. A carrying device, wherein the carrying device uses the fixing device according to claim 3.

14. The fixing device according to claim 2, wherein the engaging seat is a hollow casing having an opening, and the second locking member is a locking hole on the hollow casing; and
the first locking member comprises:
a locking protrusion, located at one end of the first locking member, and extends out of the engaging mechanism to be locked with the locking hole of the engaging seat, or retracts back inside the engaging mechanism to be unlocked with the locking hole of the engaging seat;
a first pivot, located in a middle of the first locking member, and pivotally disposed in a pivoting hole of the engaging mechanism, such that the first locking member is able to be pivoted between the locked position and the unlocked position around the first pivot; and
a pressing portion, located at the other one end of the first locking member opposite to the locking protrusion, and exposed to an outside of the engaging mechanism.

15. The fixing device according to claim 14, wherein a holding protrusion is disposed on the first locking member, and the unlocked state holding mechanism comprises a locked state holding hole and an unlocked state holding hole disposed at corresponding position of the engaging mechanism,
wherein when the first locking member is in the locked position, the holding protrusion is located in the locked state holding hole, so as to restrict the first locking member in the locked position;
wherein when the first locking member is in the unlocked position, the holding protrusion is located in the unlocked state holding hole, so as to restrict the first locking member in the unlocked position; and
wherein the locked state holding hole and the unlocked state holding hole are communicated through a second notch, and a width of the second notch is set to be smaller than diameters of the locked state holding hole and the unlocked state holding hole and smaller than a diameter of the holding protrusion.

16. The fixing device according to claim 2, wherein a spring positioning member is disposed on a bottom of the engaging mechanism, and the spring positioning member is connected to a positioning elastic member, when the engaging mechanism is engaged into the engaging seat and the first locking member is locked with the second locking member, the spring positioning member retracts into the engaging mechanism, and the positioning elastic member is compressed; and after the first locking member and the second locking member are unlocked, the positioning elastic member is able to lift up the engaging mechanism and the carrying device.

17. A passenger device, wherein the passenger device uses the fixing device according to claim 2.

18. A carrying device, wherein the carrying device uses the fixing device according to claim 2.

19. A passenger device, wherein the passenger device uses the fixing device according to claim 1.

20. A carrying device, wherein the carrying device uses the fixing device according to claim 1.

* * * * *